(12) United States Patent
Ma

(10) Patent No.: US 10,785,541 B2
(45) Date of Patent: Sep. 22, 2020

(54) SCREENCAST RECORDING METHOD, SCREENCAST PLAYING METHOD, SCREEN RECORDING TERMINAL, AND PLAYING TERMINAL

(71) Applicant: Huawei Technologies Co., Ltd., Shenzhen (CN)

(72) Inventor: Zhongqi Ma, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/464,852

(22) PCT Filed: Feb. 24, 2017

(86) PCT No.: PCT/CN2017/074751
§ 371 (c)(1),
(2) Date: May 29, 2019

(87) PCT Pub. No.: WO2018/098912
PCT Pub. Date: Jun. 7, 2018

(65) Prior Publication Data
US 2019/0327533 A1    Oct. 24, 2019

(30) Foreign Application Priority Data
Nov. 29, 2016  (CN) .......................... 2016 1 1073867

(51) Int. Cl.
*H04N 9/88* (2006.01)
*H04N 21/472* (2011.01)
(Continued)

(52) U.S. Cl.
CPC ..... *H04N 21/47217* (2013.01); *G06F 3/0484* (2013.01); *G06F 3/04812* (2013.01); *G06F 21/121* (2013.01)

(58) Field of Classification Search
USPC ............... 386/278, 280, 282, 286, 239, 240
See application file for complete search history.

(56) References Cited

U.S. PATENT DOCUMENTS

| 5,816,820 A | 10/1998 | Heinz et al. |
| 2002/0012526 A1 | 1/2002 | Sai et al. |

(Continued)

FOREIGN PATENT DOCUMENTS

| CN | 101511071 A | 8/2009 |
| CN | 102012818 A | 4/2011 |

(Continued)

OTHER PUBLICATIONS

Machine Translation and Abstract of Chinese Publication No. CN101511071, Aug. 19, 2009, 12 pages.

(Continued)

*Primary Examiner* — Daquan Zhao
(74) *Attorney, Agent, or Firm* — Conley Rose, P.C.

(57) ABSTRACT

A screencast recording method, a screencast playing method, a screen recording terminal, and a playing terminal. The recording method includes obtaining an operation performed by a screen recording user on a screen recording terminal, and determining screen content and event content that are corresponding to the operation. The method further comprises generating video data and a screen recording operation intelligent playback part based on the screen content and the event content. The method further comprises generating a screen recording file that includes the video data and the screen recording operation intelligent playback part. The playing method further includes obtaining a screen recording file. The method further includes receiving an intelligent playback instruction. The method further includes performing at least one operation according to the intelligent playback instruction.

17 Claims, 17 Drawing Sheets

(51) Int. Cl.
*G06F 3/0481* (2013.01)
*G06F 3/0484* (2013.01)
*G06F 21/12* (2013.01)
*G11B 27/00* (2006.01)
*H04N 9/80* (2006.01)

(56) References Cited

U.S. PATENT DOCUMENTS

| | | | | |
|---|---|---|---|---|
| 2005/0198353 | A1* | 9/2005 | Zmrzli | H04L 67/22 709/232 |
| 2014/0068503 | A1 | 3/2014 | Yoon | |
| 2015/0186248 | A1 | 7/2015 | Guo | |
| 2015/0378561 | A1* | 12/2015 | Ollinger | G06Q 30/016 707/769 |
| 2017/0017700 | A1* | 1/2017 | Mehrotra | G06F 16/248 |

FOREIGN PATENT DOCUMENTS

| | | |
|---|---|---|
| CN | 102279739 A | 12/2011 |
| CN | 103678106 A | 3/2014 |
| CN | 103870141 A | 6/2014 |
| CN | 103970533 A | 8/2014 |
| CN | 105763926 A | 7/2016 |
| CN | 105791951 A | 7/2016 |
| CN | 106055205 A | 10/2016 |
| WO | 2009057148 A2 | 5/2009 |

OTHER PUBLICATIONS

Machine Translation and Abstract of Chinese Publication No. CN102012818, Apr. 13, 2011, 11 pages.
Machine Translation and Abstract of Chinese Publication No. CN102279739, Dec. 14, 2011, 21 pages.
Machine Translation and Abstract of Chinese Publication No. CN103870141, Jun. 18, 2014, 17 pages.
Machine Translation and Abstract of Chinese Publication No. CN103970533, Aug. 6, 2014, 16 pages.
Machine Translation and Abstract of Chinese Publication No. CN105763926, Jul. 13, 2016, 21 pages.
Machine Translation and Abstract of Chinese Publication No. CN106055205, Oct. 26, 2016, 15 pages.
Apple, "How to use QuickTime Player," Published Date: Apr. 26, 2018, 4 pages.
Foreign Communication From a Counterpart Application, PCT Application No. PCT/CN2017/074751, English translation of International Search Report dated May 2, 2017, 2 pages.
Foreign Communication From a Counterpart Application, PCT Application No. PCT/CN2017/074751, English Translation of Written Opinion dated May 2, 2017, 5 pages.
Foreign Communication From a Counterpart Application, Chinese Application No. 201780003381.0, Chinese Office Action dated Jun. 20, 2019, 7 pages.
Chi, P., et al., "MixT: Automatic Generation of Step-by-Step Mixed Media Tutorials," XP055607129, Proceedings of the 2012 ACM Annual Conference, May 5-10, 2012, 6 pages.
Rodrigues, A., "Breaking Barriers with Assistive Macros," XP058074590, Oct. 26-28, 2015, 2 pages.
Bergman, L., et al., "DocWizards: A System for Authoring Follow-me Documentation Wizards," XP058335932, Oct. 23-27, 2005, 10 pages.
Foreign Communication From a Counterpart Application, European Application No. 17875173.1, European Search Report dated Oct. 24, 2019, 7 pages.
Machine Translation and Abstract of Chinese Publication No. CN105791951, Jul. 20, 2016, 13 pages.

\* cited by examiner

SCREENCAST RECORDING METHOD, SCREENCAST PLAYING METHOD, SCREEN RECORDING TERMINAL, AND PLAYING TERMINAL

CROSS-REFERENCE TO RELATED APPLICATIONS

This application is a national stage of International Application No. PCT/CN2017/074751, filed on Feb. 24, 2017, which claims priority to Chinese Patent Application No. 201611073867.5, filed on Nov. 29, 2016. Both of the aforementioned applications are hereby incorporated by reference in their entireties.

TECHNICAL FIELD

The present invention relates to the field of communications technologies, and in particular, to a screencast recording method, a screencast playing method, a screen recording terminal, and a playing terminal.

BACKGROUND

With rapid development of communications technologies, a user needs to continuously learn and master a new technology, to obtain a service of better quality. As mobile terminals are popularized, there is a relatively large difference between mobile terminal users in terms of ages, learning abilities, and the like. To provide users with a more comprehensive learning tutorial and a more convenient learning approach, a screen recording (that is, screencast recording) technology emerges.

A conventional screen recording technology is: In a screen recording process, a mobile terminal records content displayed on a screen to obtain a video, to record operation steps performed by a user on the screen, and then the recorded video is used to instruct another user to complete some unfamiliar or relatively complex operations.

Because in a video recording process, a time interval between operation steps is mainly controlled by a user who records a video, a time interval between two operation steps in the recorded video may be relatively short because the user is skillful. In this case, when another user watches the video, the another user may be unable to master an entire operation process because the another user does not know the operation steps and overall coherence of the operation steps is relatively high. In addition, for a cumbersome operation process, a large quantity of operation steps may be involved in a recorded video, and another user with a relatively poor learning ability may also be unable to master an entire operation process. It can be learned that, although the screen recording technology can be used to present complete operation steps performed by a user to another user, the another user probably performs a misoperation in an actual operation process because the another user cannot master an entire operation process.

SUMMARY

Embodiments of the present invention provide a screencast recording method, a screencast playing method, a screen recording terminal, and a playing terminal, to resolve a problem that another user generates a misoperation in an actual use process of a screen recording technology.

To achieve the foregoing objective, the embodiments of the present invention use the following technical solutions.

According to a first aspect, an embodiment of the present invention provides a screencast recording method. The method is applied to a screen recording terminal, and the recording method includes: obtaining an operation performed by a screen recording user on the screen recording terminal, and determining screen content and event content that are corresponding to the operation, where the event content includes at least content used to indicate a manner of generating the operation; then generating video data and a screen recording operation intelligent playback part based on the screen content and the event content, where the screen recording operation intelligent playback part includes at least corresponding screen content and event content that are used to indicate all operations in the video data; and finally generating a screen recording file that includes the video data and the screen recording operation intelligent playback part.

In a possible design, the screen recording operation intelligent playback part in the screen recording file may further include a voice auxiliary bit identifier. If audio exists for an operation corresponding to the voice auxiliary bit identifier in a process of generating the operation, the voice auxiliary bit identifier may be set to be valid.

According to a second aspect, an embodiment of the present invention provides a screen recording terminal, and the screen recording terminal can implement functions performed in the foregoing method embodiment. The functions may be implemented by hardware, or may be implemented by hardware by executing corresponding software. The hardware or software includes one or more modules corresponding to the functions.

In a possible design, a structure of the screen recording terminal includes a processor and a transceiver. The processor is configured to support the screen recording terminal in performing a corresponding function in the foregoing method. The transceiver is configured to support communication between the apparatus and another device such as a playing terminal. The screen recording terminal may further include a memory, and the memory is coupled to the processor and stores a program instruction and data required by the apparatus.

According to a third aspect, an embodiment of the present invention provides a computer storage medium. The computer storage medium is configured to store a computer software instruction used by the foregoing screen recording terminal, and the computer software instruction includes a program designed for executing the foregoing aspects.

According to a fourth aspect, an embodiment of the present invention provides a screencast playing method. The method is applied to a playing terminal, and the playing method includes: obtaining a screen recording file, where the screen recording file includes at least video data and a screen recording operation intelligent playback part, the screen recording operation intelligent playback part includes at least corresponding screen content and event content that are used to indicate at least one operation in the video data, and the event content includes at least content used to indicate a manner of generating the at least one operation; and after an intelligent playback instruction is received, performing the at least one operation according to the intelligent playback instruction, where the intelligent playback instruction is used to trigger playing of the screen recording operation intelligent playback part and performing of the at least one operation on the playing terminal.

In a possible design, after the intelligent playback instruction is received, if resolution of the playing terminal is different from resolution of a screen recording terminal, coordinates of a screen touching operation generated on the screen recording terminal in the video data are converted into specified coordinates on the playing terminal. The screen recording terminal is a terminal that generates the screen recording file. Then the at least one operation is performed on the playing terminal based on the specified coordinates. It can be learned that, in the foregoing possible design, a problem of an inconsistent operation or a misoperation caused by different resolution of the screen recording terminal and the playing terminal can be effectively avoided. For a playing terminal and a screen recording terminal with same resolution, event content of at least one input event can be directly performed without screen adaption. For a playing terminal and a screen recording terminal with different resolution, after screen adaptation is completed, intelligent playback of the screen recording file can be performed provided that resolution of the playing terminal and resolution of the screen recording terminal are the same.

In a possible design, if the at least one operation includes at least two operations, a process of performing the at least one operation may be implemented as follows: if the resolution of the playing terminal is the same as the resolution of the screen recording terminal, successively performing all of the at least one operation. It can be learned that input events are successively performed based on a specific sequence, while a user does not need to successively perform, by imitating event content of each input event in the screen recording file, operations corresponding to a plurality of steps. In this way, not only operation steps can be reduced for the user, but also it can be ensured that all the input events are successively triggered, to complete an entire screen recording playback process.

In a possible design, the process of performing the at least one operation may be implemented by using different implementation processes based on whether current screen content is the same as screen content on which a specified operation is generated. If the current screen content is the same as the screen content on which the specified operation is generated, the specified operation is performed. If the current screen content is different from the screen content on which the specified operation is generated, interface matching is performed until the current screen content is the same as the screen content on which the specified operation is generated, and then the specified operation is performed.

In a possible design, the performing interface matching until the current screen content is the same as the screen content on which the specified operation is generated may be specifically: obtaining display content of a specified area in an interface in which the specified operation is generated, and then detecting, based on a specified interval, whether an area that is the same as the display content exists in the current screen content, and when the area that is the same as the display content exists, determining that the current screen content is the screen content on which the specified operation is generated. In this case, if the playing terminal still uses a time interval of performing corresponding operations on the screen recording terminal, once performance of the playing terminal is relatively poor, a time for a process of performing an interface jump or other instruction processing by the playing terminal may be longer than that for performing a corresponding operation on the screen recording terminal. Consequently, it is possible that a corresponding interface jump has not occurred on the playing terminal, or currently a next executable operation does not exist on the playing terminal. Therefore, to avoid the foregoing case, when the event content of each input event is being performed, an interface matching operation needs to be completed by determining whether a current interface is an interface in which a specified input event is generated, and after interface matching succeeds, a corresponding operation is performed, thereby increasing a success rate of implementing intelligent playback, and effectively avoiding a problem such as an intelligent playback failure or intelligent playback termination caused by a performance difference between two terminals.

In a possible design, before the obtaining display content of a specified area in an interface in which the specified operation is generated, the playing method may further include: obtaining a package name and a class name of an application corresponding to the specified operation in the screen recording file; then determining, based on the package name of the application, the application corresponding to the specified operation, and accessing the application; and if the screen recording file has permission to access the application, determining, based on the class name, a specified interface corresponding to the specified operation, and jumping to the specified interface. It can be learned that, whether the screen recording file has the permission to access the application also affects a success rate of a screen recording intelligent playback process. Therefore, in the foregoing possible design, different implementation procedures are provided for the two cases: having access permission and having no access permission.

In a possible design, after the determining, based on the package name of the application, the application corresponding to the specified operation, and accessing the application, the playing method may further include: if the screen recording file has no permission to access the application, generating prompt information, where the prompt information is used to prompt a user to enable the permission to access the application; and after the screen recording file has the permission to access the application, determining, based on the class name, the specified interface corresponding to the specified operation, and jumping to the specified interface. It can be learned that before starting the entire intelligent playback process, the playing terminal first jumps to the interface corresponding to the specified input event, so that after starting the intelligent playback, the playing terminal can directly complete, based on content recorded in the screen recording operation intelligent playback part, an operation corresponding to the at least one input event.

In a possible design, the screen recording operation intelligent playback part may further include a voice auxiliary bit identifier, and when the specified operation is being performed, if the voice auxiliary bit identifier is valid, audio corresponding to the specified operation is played. Because a user who uses intelligent playback may be a user with a visual impairment, to help the user know operation steps in the entire intelligent playback process, in the foregoing possible design, the screen recording file further includes a voice auxiliary bit identifier. In a process in which the playing terminal performs intelligent playback, the playing terminal may choose, based on information recorded in the voice auxiliary bit, whether to play audio corresponding to an operation that is being performed, and play the audio when the audio needs to be played.

In a possible design, after performing the at least one operation, the playing terminal may jump from a current interface to an interface existing before the at least one operation is performed. In this way, after performing the at least one operation, based on a requirement of the user, the playing terminal may jump from the current interface to the display interface existing before the at least one operation is performed.

According to a fifth aspect, an embodiment of the present invention provides a playing terminal, and the playing terminal can implement functions performed in the foregoing method embodiment. The functions may be implemented by hardware, or may be implemented by hardware by executing corresponding software. The hardware or software includes one or more modules corresponding to the functions.

In a possible design, a structure of the playing terminal includes a processor and a transceiver. The processor is configured to support the playing terminal in performing a corresponding function in the foregoing method. The transceiver is configured to support communication between the apparatus and another device such as a screen recording terminal. The playing terminal may further include a memory, and the memory is coupled to the processor and stores a program instruction and data required by the apparatus.

According to a sixth aspect, an embodiment of the present invention provides a computer storage medium. The computer storage medium is configured to store a computer software instruction used by the foregoing playing terminal, and the computer software instruction includes a program designed for executing the foregoing aspects.

Compared with the prior art in which another user performs a misoperation in an actual operation process because the another user cannot master an entire operation process, in the embodiments of the present invention, after the intelligent playback instruction is received, the event content of the at least one input event in the obtained screen recording file can be performed. It can be learned that the foregoing implementation process is performed by the playing terminal based on the screen recording file, while the user does not need to manually complete each operation step presented in a recorded video after watching the video. In this way, a manual operation process of the user can be simplified, thereby resolving a problem of a misoperation caused by a manual operation performed by the user.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the embodiments of the present invention.

The embodiments of the present invention may be applied to a terminal. The terminal may be a screen recording terminal or a playing terminal, and may be specifically a mobile terminal such as a smartphone or a tablet computer, or another terminal on which operations similar to tapping, sliding, and the like can be performed. The screen recording terminal is a terminal that generates a screen recording file, and the playing terminal is a terminal that plays the screen recording file. Generally, the screen recording terminal and the playing terminal are two different terminals, but may be a same terminal. For example, different users separately generate and play a screen recording file on a same terminal, or a same user uses a same terminal to demonstrate a process of a same operation for different users.

Figure 1:
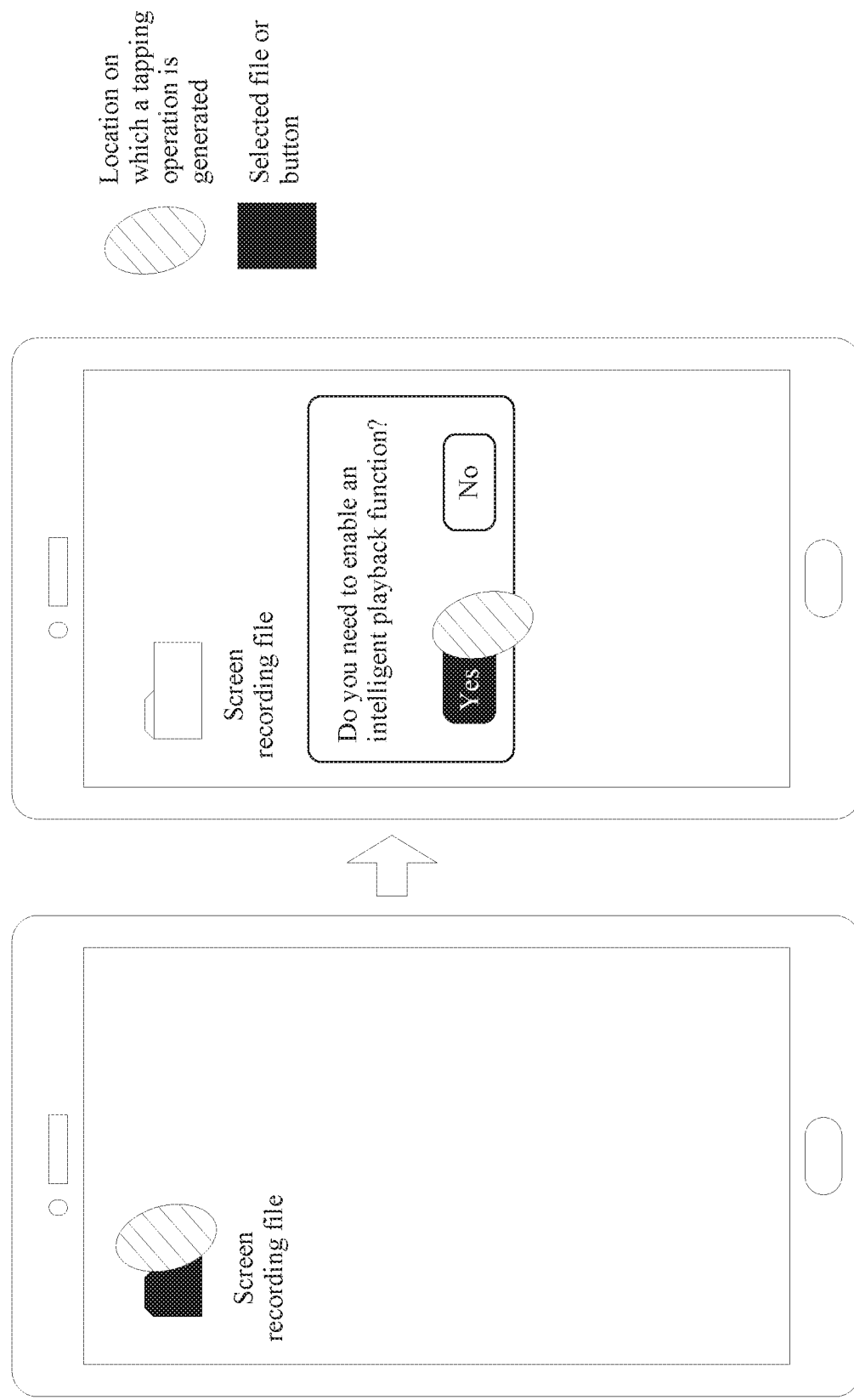
FIG. 1 is a schematic diagram of a display interface of a playing terminal according to an embodiment of the present invention.

For example, FIG. 1 shows a change of a possible display interface of a playing terminal when different operations are performed. In the display interface, a user may obtain, by performing a tapping operation, a screen recording file sent by another user, a screen recording file locally stored in the playing terminal, or a screen recording file obtained by the playing terminal from a database or a network side device over a network or the like. The tapping operation may be specifically tapping, double tapping, a tapping operation performed at a specific frequency and/or for a specific quantity of times, and/or a tapping operation with a specific pressing force. This is not limited herein. In addition, a manner of obtaining the screen recording file is not limited to the tapping operation, and may be another implementation such as dragging or sliding. This is not limited herein. Subsequently, a dialog box may pop up and/or a prompt tone may be played in the display interface, to query the user whether an intelligent playback function needs to be enabled. FIG. 1 shows only a case in which a dialog box pops up. If the playing terminal receives an instruction that the user attempts to perform intelligent playback, for example, as shown in FIG. 1, in the pop-up dialog box, the user triggers the intelligent playback function by performing a tapping operation, when actual resolution of the screen recording file is the same as resolution of the playing terminal, the playing terminal may perform event content of at least one input event, that is, at least one operation recorded in the screen recording file, to complete an intelligent playback process of a part or all of the screen recording file.

It should be noted that, the foregoing implementation is merely a possible implementation, and a presentation status of the display interface of the playing terminal is also one of examples. Another possible display manner of the playing terminal is further presented below, but a display manner is not limited to the display manners mentioned in the embodiments of the present invention.

Figure 2:
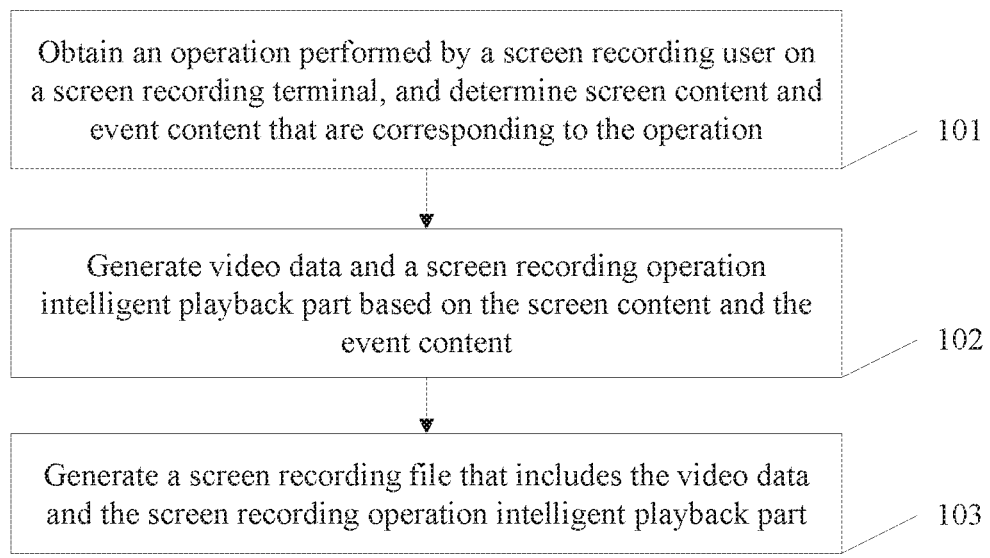
FIG. 2 is a flowchart of a screencast recording method according to an embodiment of the present invention.

An embodiment of the present invention provides a screencast recording method, and the method is applied to a screen recording terminal. As shown in FIG. 2, the method specifically includes the following steps.

Step 101: Obtain an operation performed by a screen recording user on the screen recording terminal, and determine screen content and event content that are corresponding to the operation.

The event content includes at least content used to indicate a manner of generating the operation.

In a process in which the user performs an operation on the screen recording terminal, each time the user performs an operation, the screen recording terminal obtains an action performed by the user when a current operation is triggered, that is, the event content, and also obtains a display status of a current interface, that is, the screen content. Further details of the event content and the screen content are described below, and details are not described herein again.

Step 102: Generate video data and a screen recording operation intelligent playback part based on the screen content and the event content.

The screen recording operation intelligent playback part includes at least corresponding screen content and event content that are used to indicate all operations in the video data.

Step 103: Generate a screen recording file that includes the video data and the screen recording operation intelligent playback part.

Figure 3:
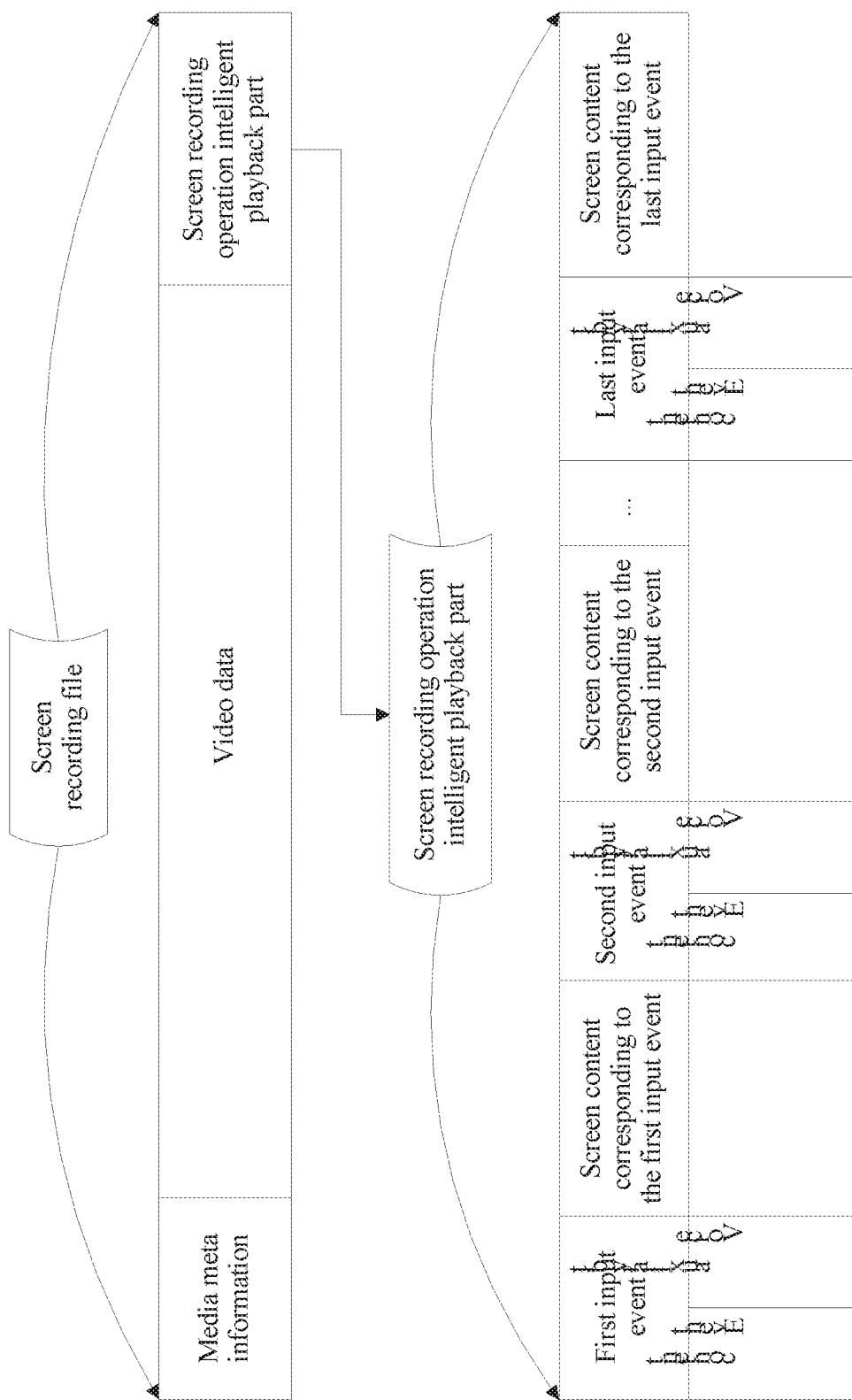
FIG. 3 is a schematic structural diagram of a screen recording file according to an embodiment of the present invention.

As shown in FIG. 3, FIG. 3 is a schematic diagram of composition of a screen recording file and a schematic diagram of composition of a screen recording operation intelligent playback part in the screen recording file. It should be noted that content shown in FIG. 3 is merely a possible implementation, and all parts of content included in the screen recording file or the screen recording operation intelligent playback part may be arranged in a manner shown in FIG. 3, or may be arranged in another combination manner. A location of each part is not limited in this embodiment of the present invention.

In FIG. 3, the screen recording file includes not only the video data and the screen recording operation intelligent playback part, but also media meta information. The media meta information is used to record information received by an audio information collection device such as a microphone (microphone, MIC) when the screen recording terminal records a screencast. The video data is used to record content presented on a screen of the screen recording terminal during screencast recording. The screen recording operation intelligent playback part is used to record each input event and screen content corresponding to the input event, and the input event includes at least event content.

Figure 4:
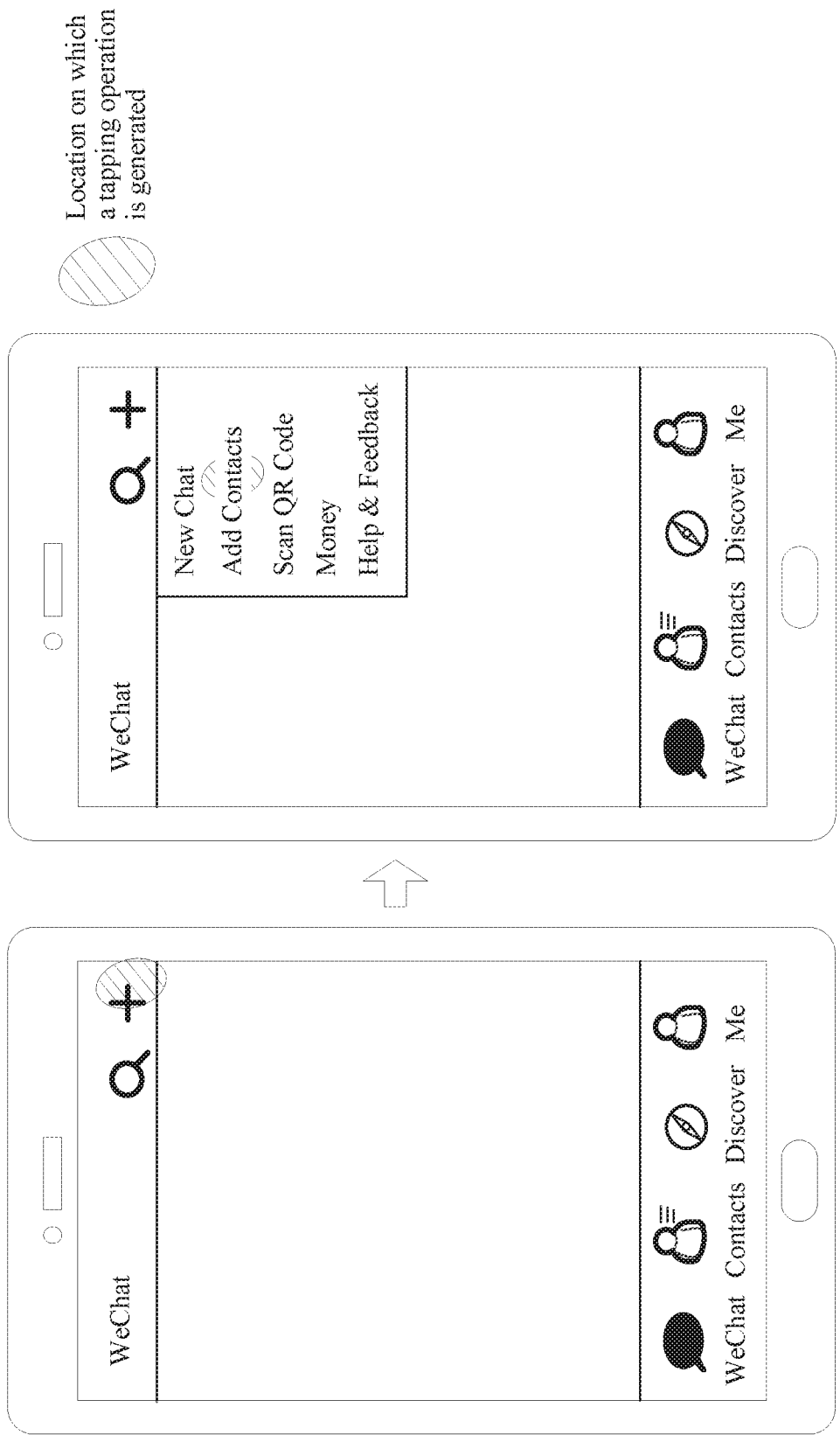
FIG. 4 is a schematic diagram of a display interface of a screen recording terminal according to an embodiment of the present invention.

For example, as shown in FIG. 4, FIG. 4 is a schematic diagram of a display interface of a screen recording terminal when a user performs screen recording on the screen recording terminal. In an operation procedure shown in FIG. 4, an interface initially displayed on the screen recording terminal is a display interface of WeChat. The user taps "+" on an upper right corner of the display interface, then a menu bar pops up, and the user taps "Add Contacts". In the process, there are two user operations: tapping "+" and tapping "Add Contacts". In an example of the screen recording file shown in FIG. 3, the screen recording operation intelligent playback part includes two input events: a first input event and a second input event. The first input event is generated before the second input event, and both event content of the first input event and event content of the second input event are tapping operations. Screen content corresponding to the first input event is a main display interface of WeChat, for example, a display interface shown on the left of FIG. 4. Screen content corresponding to the second input event is a display interface in which the menu bar pops up, for example, a display interface shown on the right of FIG. 4.

In addition, in this embodiment of the present invention, the input event may further include a voice auxiliary bit, and a current terminal may determine, based on the voice auxiliary bit identifier, whether to play audio corresponding to the event content. For a specific implementation, refer to the following description, and details are not described herein again.

When a screen recording file generated by using the foregoing implementation is played on a playing terminal, not only a playing mode in which a user watches the screen recording file in the background can be used, but also the playing terminal can directly complete, for the user, some or all input events recorded in the screen recording file. In the screen recording file generated by using the solution provided in this embodiment of the present invention, event content of each input event and corresponding screen content on which the input event is generated can be recorded, so that during subsequent intelligent playback, all operations performed during screen recording can be effectively restored.

Because a user who uses intelligent playback may be a user with a visual impairment, in an implementation of this embodiment of the present invention, as shown in FIG. 3, the screen recording operation intelligent playback part further includes a voice auxiliary bit identifier, to help the user know operation steps in the entire intelligent playback process. If audio exists for an operation corresponding to the voice auxiliary bit identifier in a process of generating the operation, the voice auxiliary bit identifier is set to be valid. For example, if a first input event has corresponding audio, to be specific, the user describes or explains the first input event, or the operation triggers the screen recording terminal to generate a piece of audio, a voice auxiliary bit of the first input event may be set to be valid, to effectively restore the audio in an intelligent playback process. It should be noted that, because generally only a minority of input events in the screen recording operation intelligent playback part have corresponding audio, in this embodiment of the present invention, the voice auxiliary bit is invalid by default. If a voice auxiliary bit is required, the voice auxiliary bit is set during generation of a corresponding operation.

Figure 5:
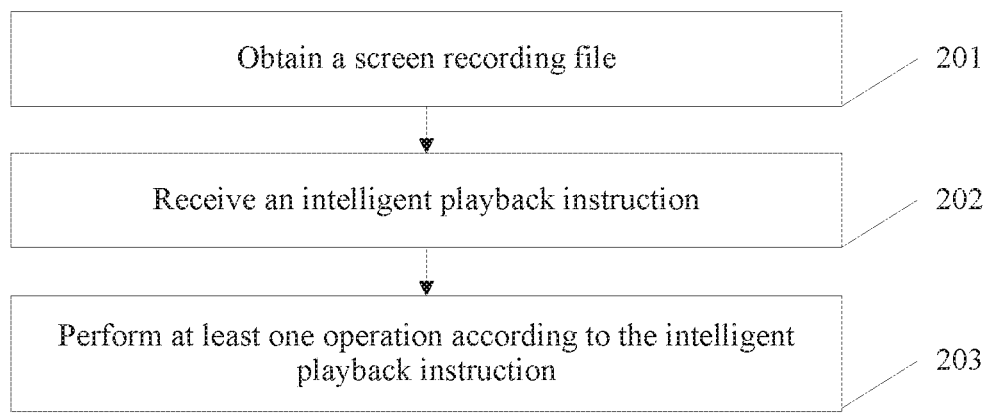
FIG. 5 is a flowchart of a screencast playing method according to an embodiment of the present invention.

After the screen recording file is generated on the screen recording terminal, once the user needs the screen recording file, the user may obtain the screen recording file over a network or the like, and then run the screen recording file on the playing terminal based on a requirement of the user. An embodiment of the present invention provides a screencast playing method, and the method is applied to a playing terminal. As shown in FIG. 5, the method specifically includes the following steps.

Step 201: Obtain a screen recording file.

The screen recording file includes at least video data and a screen recording operation intelligent playback part, the screen recording operation intelligent playback part includes at least corresponding screen content and event content that are used to indicate at least one operation in the video data, and the event content includes at least content used to indicate a manner of generating the at least one operation.

Step 202: Receive an intelligent playback instruction.

The intelligent playback instruction is used to trigger playing of the screen recording operation intelligent playback part and performing of the at least one operation on the playing terminal.

Once the intelligent playback instruction is received, regardless of whether a piece of video data has been currently played, or no content in the screen recording file is currently played, intelligent playback is performed on the screen recording operation intelligent playback part from a to-be-generated input event. This means that intelligent playback may be performed starting from a first input event or starting from any one of a second input event to a last input event. A specific input event starting from which intelligent playback is performed mainly depends on a time of receiving the intelligent playback instruction. Alternatively, a user or an operator may set in advance that intelligent playback is performed starting from which input event after the intelligent playback instruction is received, and a specific occasion for performing intelligent playback is not limited herein.

If the screen recording file is a file sent by a screen recording terminal to the playing terminal, the playing terminal can prompt, in a form of a suspend button, in a manner of a composite key, or in another form that can be used to select a screen recording file sent from the screen recording terminal, the user to enter the intelligent playback instruction. Certainly, the playing terminal may provide no prompt for the user, and the user independently enters the intelligent playback instruction, to trigger a playback process of the screen recording file.

Figure 6:
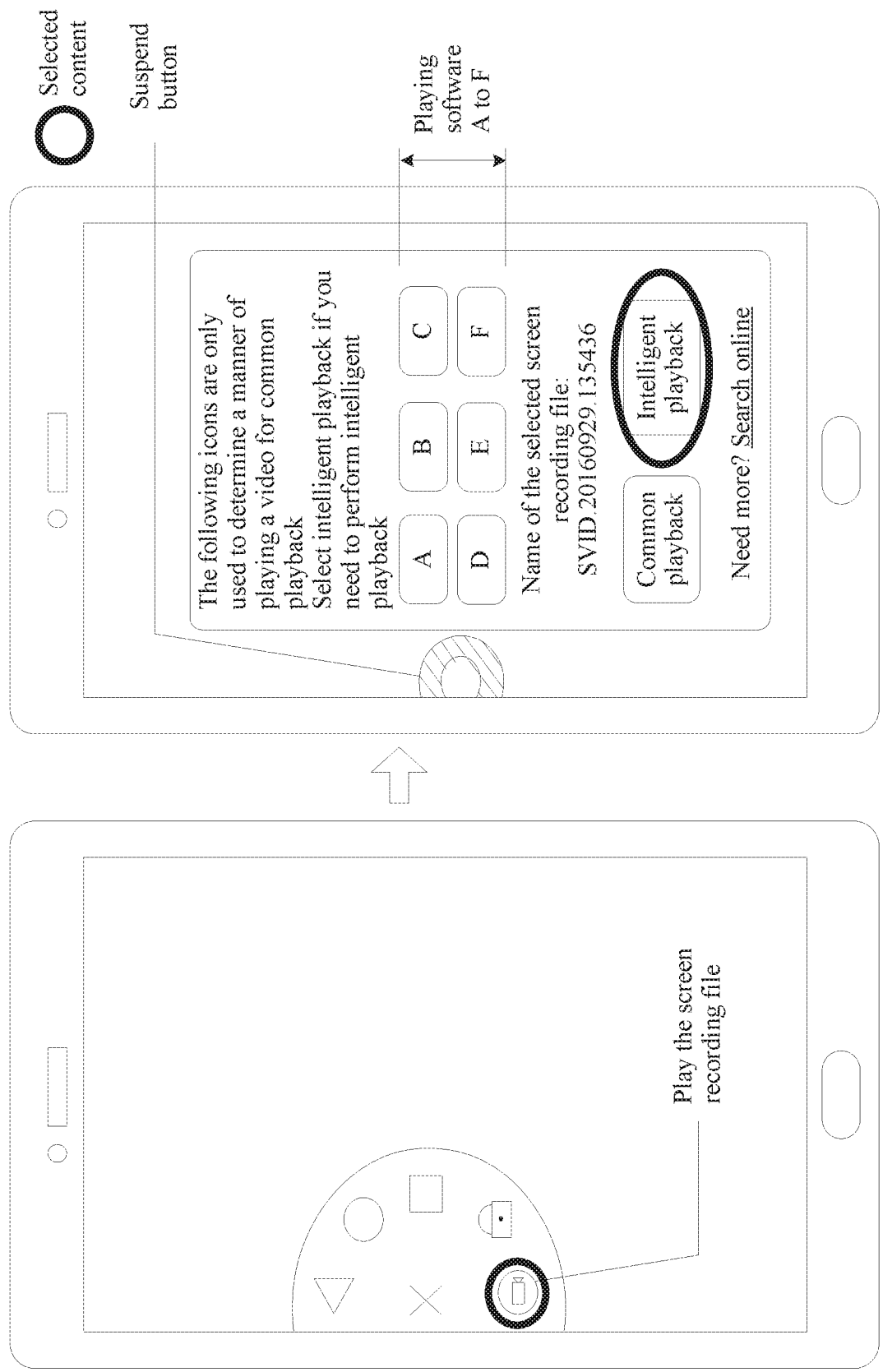
FIG. 6 is a schematic diagram of another display interface of a playing terminal according to an embodiment of the present invention.

For example, FIG. 6 shows an implementation in which a playing terminal presents, in a form of a suspend button, options for playing a screen recording file. When the user touches an area that is in the suspend button and that indicates playing of the screen recording file, a dialog box for selecting a playing mode by the user pops up in a display interface of the playing terminal. The user may choose, by performing a tapping operation, to perform common playback of the screen recording file in a conventional manner, or may use an implementation mentioned in this embodiment of the present invention, that is, intelligent playback. If the user attempts to select the common playback, the pop-up dialog box may further provide a plurality of playing software options for the user to select. If the user initially selects the common playback, and the user has completed operations corresponding to several initial input events, the user may switch a playing mode during the common playback, to be specific, switch the common playback to the intelligent playback. For example, the user may still complete the switching function by using the options in the suspend button.

Step 203: Perform at least one operation according to the intelligent playback instruction.

In this embodiment of the present invention, event content of at least one input event in the obtained screen recording file may be performed after the intelligent playback instruction is received. It can be learned that a process of performing the event content of the at least one input event is performed by the playing terminal based on the screen recording file, while the user does not need to manually complete each operation step presented in a recorded video after watching the video. In this way, a manual operation process of the user can be simplified, thereby resolving a problem of a misoperation caused by a manual operation performed by the user.

Figure 7:
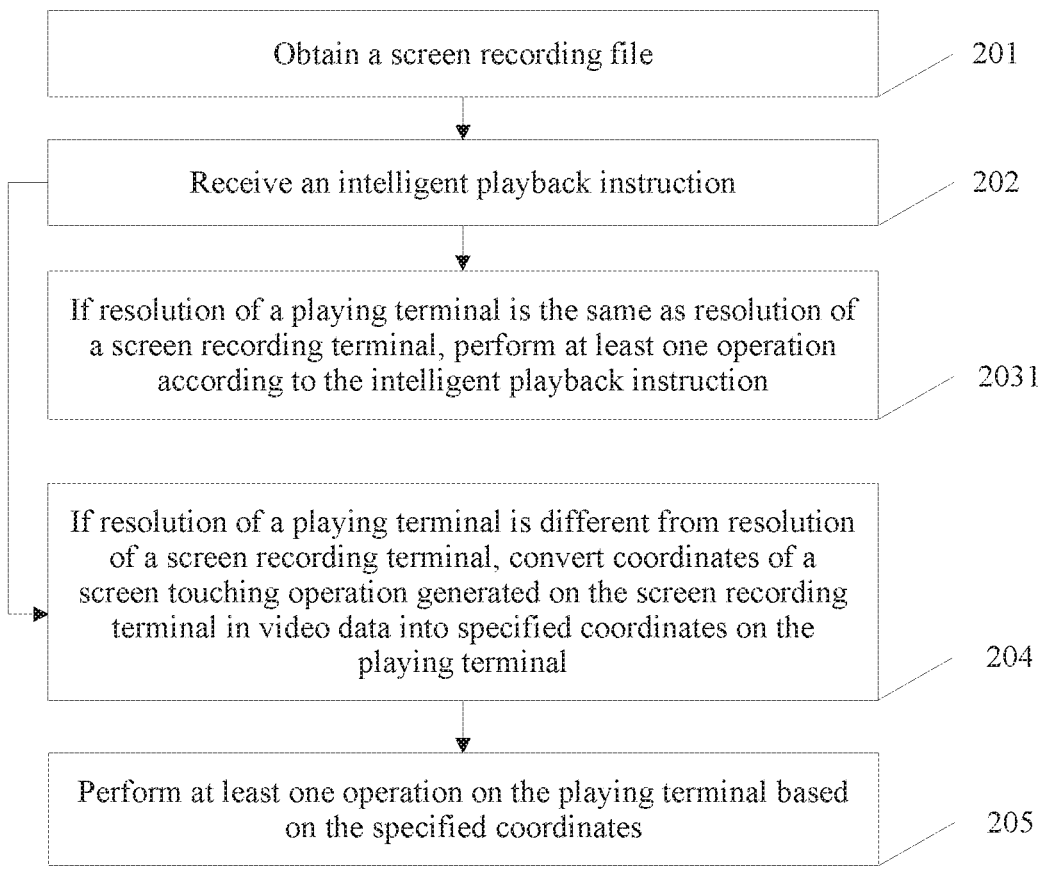
FIG. 7 is a flowchart of another screencast playing method according to an embodiment of the present invention.

In an implementation of this embodiment of the present invention, when resolution of the playing terminal is different from resolution of the screen recording terminal, screen adaptation may be further performed, to increase a success rate of performing a set of operation procedures by the playing terminal through intelligent playback. Therefore, based on the implementation shown in FIG. 5, an implementation shown in FIG. 7 may be further implemented. After step 202 of receiving the intelligent playback instruction is performed, step 204 and step 205 may be further performed, and step 203 of performing the at least one operation according to the intelligent playback instruction may be specifically implemented as step 2031.

Step 204: If resolution of the playing terminal is different from resolution of a screen recording terminal, convert coordinates of a screen touching operation generated on the screen recording terminal in video data into specified coordinates on the playing terminal.

The screen recording terminal is a terminal that generates the screen recording file.

If the screen recording file includes the resolution of the screen recording terminal, the playing terminal may directly obtain the resolution of the screen recording terminal from the screen recording file, or the playing terminal may determine the resolution of the screen recording terminal based on a resolution status of the video data in the screen recording file, and then locally obtain the resolution of the playing terminal. It should be noted that a manner of obtaining the resolution is not limited to the foregoing implementation, and may be another means that can be used to extract resolution information. This is not limited herein. In addition, the resolution may be specifically screen resolution of the playing terminal and screen resolution of the screen recording terminal.

In this embodiment of the present invention, the display interface of the playing terminal and a display interface of the screen recording terminal may be separately used as coordinate planes, and respective coordinate systems are established on the two coordinate planes. After the two coordinate systems are established, the playing terminal may map a relationship between coordinates of a generated screen touching operation and a coordinate system corresponding to the screen recording terminal to a relationship between coordinates of a screen touching operation that needs to be generated in the display interface of the playing terminal and a coordinate system corresponding to the playing terminal, and determine, based on the relationship and the coordinate system corresponding to the playing terminal, the coordinates of the screen touching operation that needs to be generated in the display interface of the playing terminal, to complete the foregoing coordinate conversion process, that is, obtain the specified coordinates.

Figure 8:
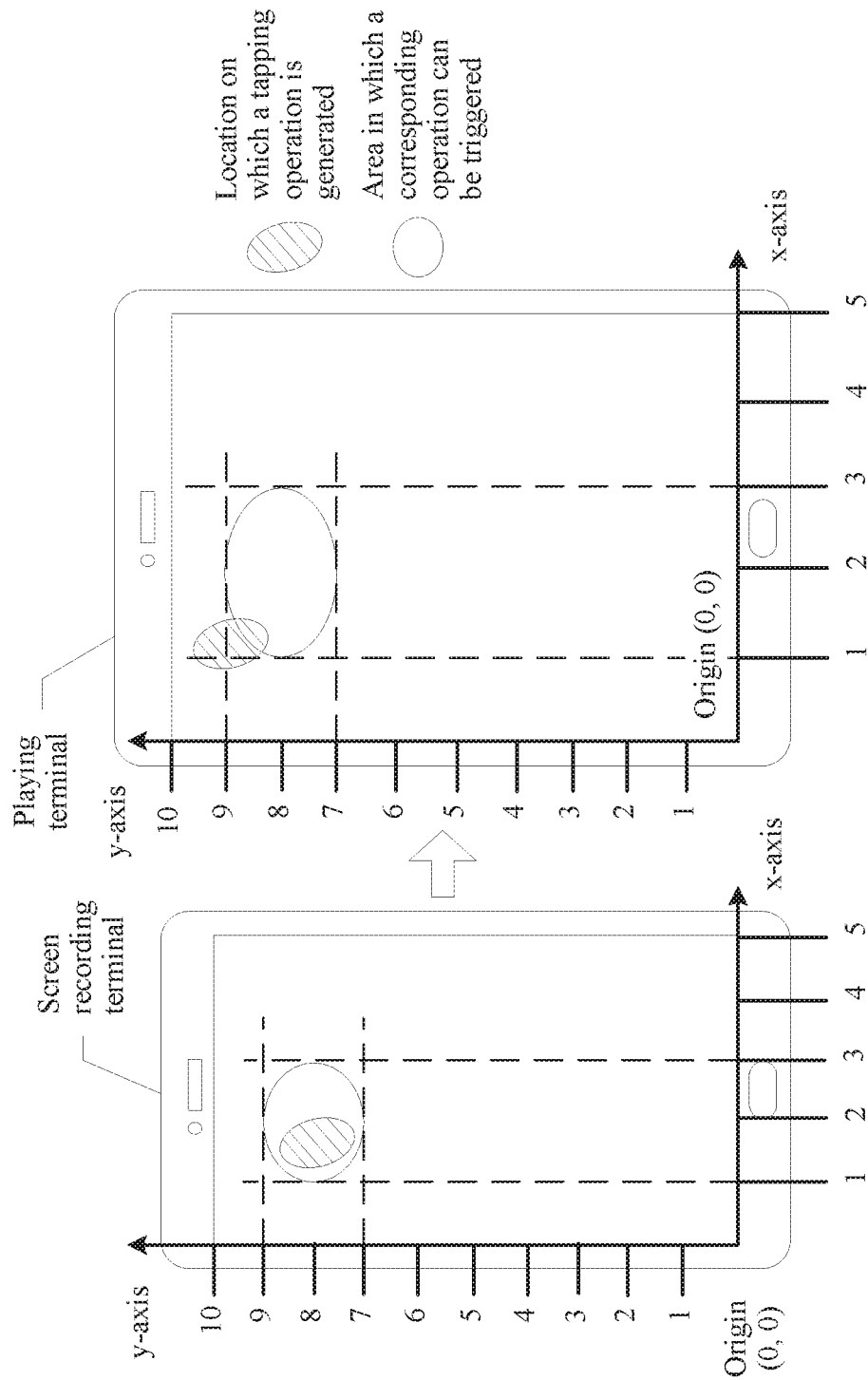
FIG. 8 is a schematic diagram of another display interface of a playing terminal according to an embodiment of the present invention.

Although the resolution of the screen recording terminal is different from the resolution of the playing terminal, coordinate systems may be established on different terminals in a same manner, to improve accuracy of screen recording playback. For example, as shown in FIG. 8, for the screen recording terminal, a lower left corner of a screen is used as an origin, an x-axis is established along a bottom side of the screen, and a left-to-right direction of the bottom side is used as a positive direction of the x-axis. Likewise, a y-axis is established along a left side of the screen, and a bottom-to-top direction of the left side is used as a positive direction of the y-axis. Then the left side is divided into 10 equal parts, and the bottom side is divided into five equal parts, so that a rectangular coordinate system of the screen is established based on the screen recording terminal. In a same manner, a rectangular coordinate system is established on the playing terminal based on a screen of the playing terminal. As shown in FIG. 8, during screen recording, a valid area corresponding to a location of the touching operation performed by the user on the screen recording terminal is a quadrangle area formed after four dashed lines are crossed. It should be noted that, although the touching operation does not fill the entire quadrangle area, because of sensitivity of the screen, a corresponding operation can be triggered provided that the touching operation is generated in an elliptic area in the quadrangle area. In addition, provided that it is ensured that a location on which a tapping operation is generated completely falls within the quadrangle area, it can be ensured that most of the location on which the tapping operation is generated falls within the elliptic area, thereby triggering a corresponding operation. Therefore, although unit distances of the respective rectangular coordinate systems of the screen recording terminal and the playing terminal are different, a corresponding operation may be accurately triggered provided that screen touching operations are on a same relative location on the screens. For example, as shown in FIG. 8, in the screen recording terminal, the quadrangle area is an area formed by using coordinates (1, 9), (1, 7), (3, 7), and (3, 9) that are used as vertices, and therefore, in the playing terminal, a corresponding quadrangle area is also an area formed by using coordinates (1, 9), (1, 7), (3, 7), and (3, 9) that are used as vertices. It can be learned that, in FIG. 8, if the location on which the operation is generated is a location, shown on the playing terminal, on which a tapping operation is generated, functions such as an interface jump function and a menu pop-up function cannot be successfully triggered on the playing terminal.

It should be noted that a manner of establishing the coordinate system is not limited to the implementation shown in FIG. 8. For example, a location of the origin may be set on any location on the screen recording terminal, provided that it is ensured that a relative location relationship between the origin on the screen recording terminal and an origin on the playing terminal remains unchanged. The relative location relationship may be measured by using a distance from the origin to each side, or in another manner that can be used to indicate the relative location relationship. This is not limited herein. For another example, unit lengths of the coordinate systems located on the screen recording terminal and the playing terminal may be the same or different. When the unit lengths are the same, a relative relationship between the two coordinate systems may be determined with reference to a proportion of sides located on a same location of the two screens, so that a point on the playing terminal can be determined based on a corresponding point on the screen recording terminal. When the unit lengths are different, a case similar to the following case shown in FIG. 8 may occur: quantities of unit lengths by which the two x-axes are divided are the same and quantities of unit lengths by which the two y-axes are divided are the same; or it is possible that quantities of unit lengths by which the two x-axes are divided are different, and quantities of unit lengths by which the two y-axes are divided are different; or it is possible that only quantities of segments into which the x-axes are divided are the same or only quantities of segments into which the y-axes are divided are the same. However, a manner of reflecting the relative location relationship is consistent with that of the case in which the unit lengths are the same, and details are not described herein again. In addition, the coordinate system is not limited only to the rectangular coordinate system, and may be a coordinate system of another type, and details are not described one by one herein. In addition, a location may be represented by using a vector or another form in addition to coordinates.

It should be noted that, a conversion manner is not limited to the foregoing implementation, and may be another implementation that can implement the coordinate conversion. This is not limited herein.

Step 205: Perform the at least one operation on the playing terminal based on the specified coordinates.

Step 2031: If the resolution of the playing terminal is the same as the resolution of the screen recording terminal, perform the at least one operation according to the intelligent playback instruction.

After the coordinate conversion process is completed, event content of each input event in the screen recording file may be completed on a corresponding location on the playing terminal, to be specific, within the elliptic area in the display interface of the playing terminal shown in FIG. 8. In this way, the playing terminal may complete the event content of the at least one input event in the display interface of the playing terminal based on the specified coordinates.

In this embodiment of the present invention, using a screen adaptation manner can avoid a problem that a corresponding function cannot be triggered because of different resolution of terminals. In this embodiment of the present invention, for a playing terminal and a screen recording terminal with same resolution, the event content of the at least one input event can be directly performed without screen adaption. For a playing terminal and a screen recording terminal with different resolution, after screen adaptation is completed, intelligent playback of the screen recording file can be performed provided that uniform mapping can be successfully performed between resolution of the playing terminal and resolution of the screen recording terminal. It can be learned that, in the foregoing implementation, a problem of an inconsistent operation or a misoperation caused by different resolution of the screen recording terminal and the playing terminal can be effectively avoided.

Figure 9:
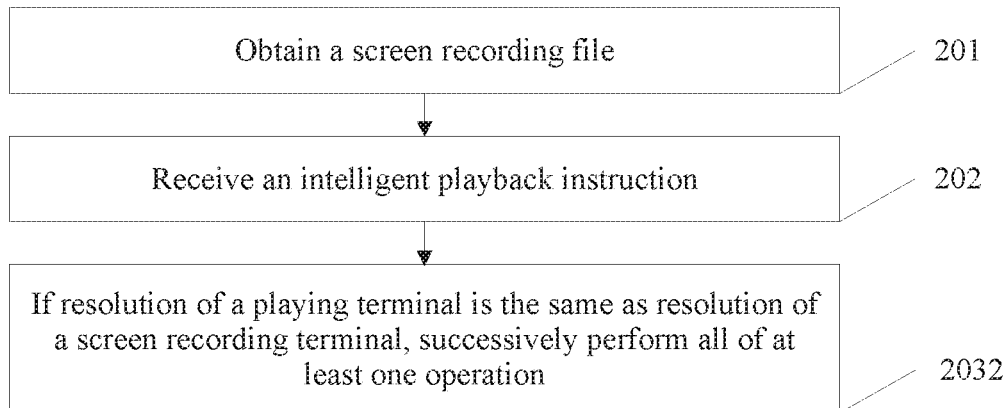
FIG. 9, FIG. 10, and FIG. 11 are flowcharts of another screencast playing method according to an embodiment of the present invention.

In an implementation of this embodiment of the present invention, there may be one or more input events. If there are a plurality of input events, operations corresponding to all of the at least one input event need to be successively performed. Therefore, based on the implementation shown in FIG. 5 or FIG. 7, for example, based on the implementation shown in FIG. 5, an implementation shown in FIG. 9 may be further implemented. Step 203 of performing the at least one operation according to the intelligent playback instruction may be specifically implemented as step 2032.

Step 2032: If the resolution of the playing terminal is the same as the resolution of the screen recording terminal, successively perform all of the at least one operation.

The screen recording file shown in FIG. 3 is used as an example, and successively performing the event content of the at least one input event is specifically: performing event content of the first input event on the playing terminal, and after the event content is performed, performing event content of the second input event; likewise, after event content of the last input event is performed, or after the playing terminal receives an instruction for terminating the intelligent playback, stopping a current operation or stopping the intelligent playback after a current operation is performed.

Figure 10:
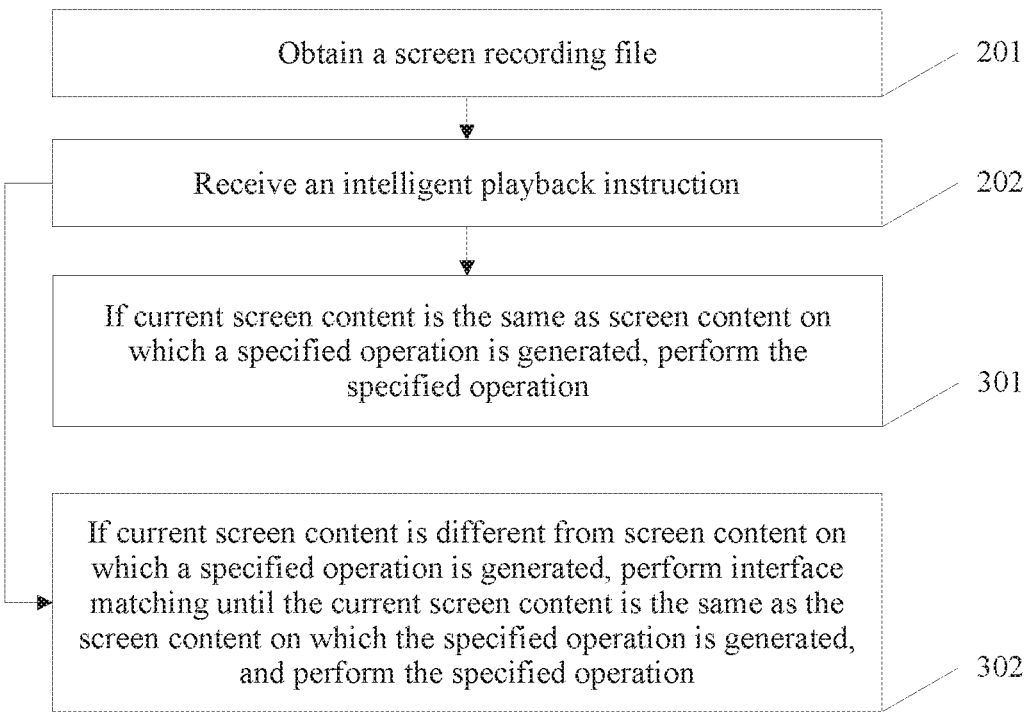

Performance of the screen recording terminal and the playing terminal may be different, and this means that reaction times of the screen recording terminal and the playing terminal in a process such as an interface jump process or a menu pop-up process are different. Such a time delay may also cause a misoperation. Therefore, in a process of performing the at least one operation, an interface matching relationship also needs to be considered, and a corresponding operation can be further performed only when the two interfaces are the same. Therefore, based on the implementations shown in FIG. 5, FIG. 7, and FIG. 9, for example, based on the implementation shown in FIG. 5, an implementation shown in FIG. 10 may be further implemented. Step 203 of performing the at least one operation according to the intelligent playback instruction may be specifically implemented as step 301 and step 302.

Step 301: If current screen content is the same as screen content on which a specified operation is generated, perform the specified operation.

Step 302: If the current screen content is different from the screen content on which the specified operation is generated, perform interface matching until the current screen content is the same as the screen content on which the specified operation is generated, and perform the specified operation.

In this embodiment of the present invention, the specified operation may be a currently to-be-performed operation, that is, any one of the at least one operation. Before each input event is performed, it needs to be determined whether screen content during screen recording is the same as current screen content, and a corresponding operation is performed only when the screen content during screen recording is the same as the current screen content.

Figure 11:
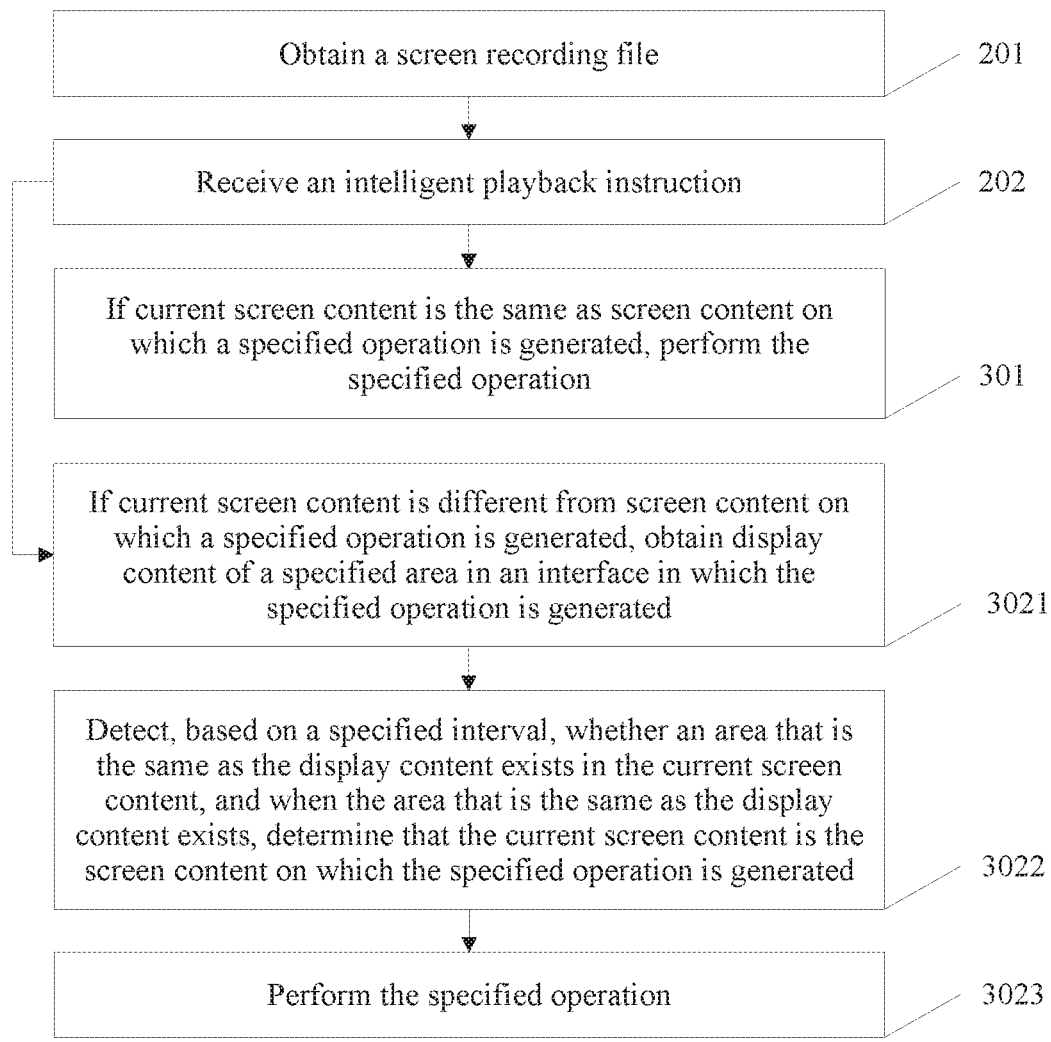

In this embodiment of the present invention, in a process of determining whether a current interface is the same as an interface in which a specified input event is generated, whether the two interfaces are the same may be determined based on whether display content of a specified area in the current interface is the same as display content of the specified area in the interface in which the specified input event is generated. Therefore, based on the implementation shown in FIG. 10, an implementation shown in FIG. 11 may be further implemented. Step 302 may be specifically implemented as step 3021 to step 3023.

Step 3021: If the current screen content is different from the screen content on which the specified operation is generated, obtain display content of a specified area in an interface in which the specified operation is generated.

Step 3022: Detect, based on a specified interval, whether an area that is the same as the display content exists in the current screen content, and when the area that is the same as the display content exists, determine that the current screen content is the screen content on which the specified operation is generated.

The specified interval may be a preset fixed time interval or a preset irregular time interval, or detection may be performed in real time. The specified interval may be set to a relatively long or short time based on a requirement of the user, and may be specifically preset by the user based on historical data or an empirical value. For example, when the specified interval is set to a relatively short time, the foregoing detection process may be considered as real-time monitoring, so as to reduce a time wasted in a matching process, but this causes excessive resource wastes. Therefore, the user may choose to set the specified interval to a suitable time length.

Step 3023: Perform the specified operation.

Figure 12:
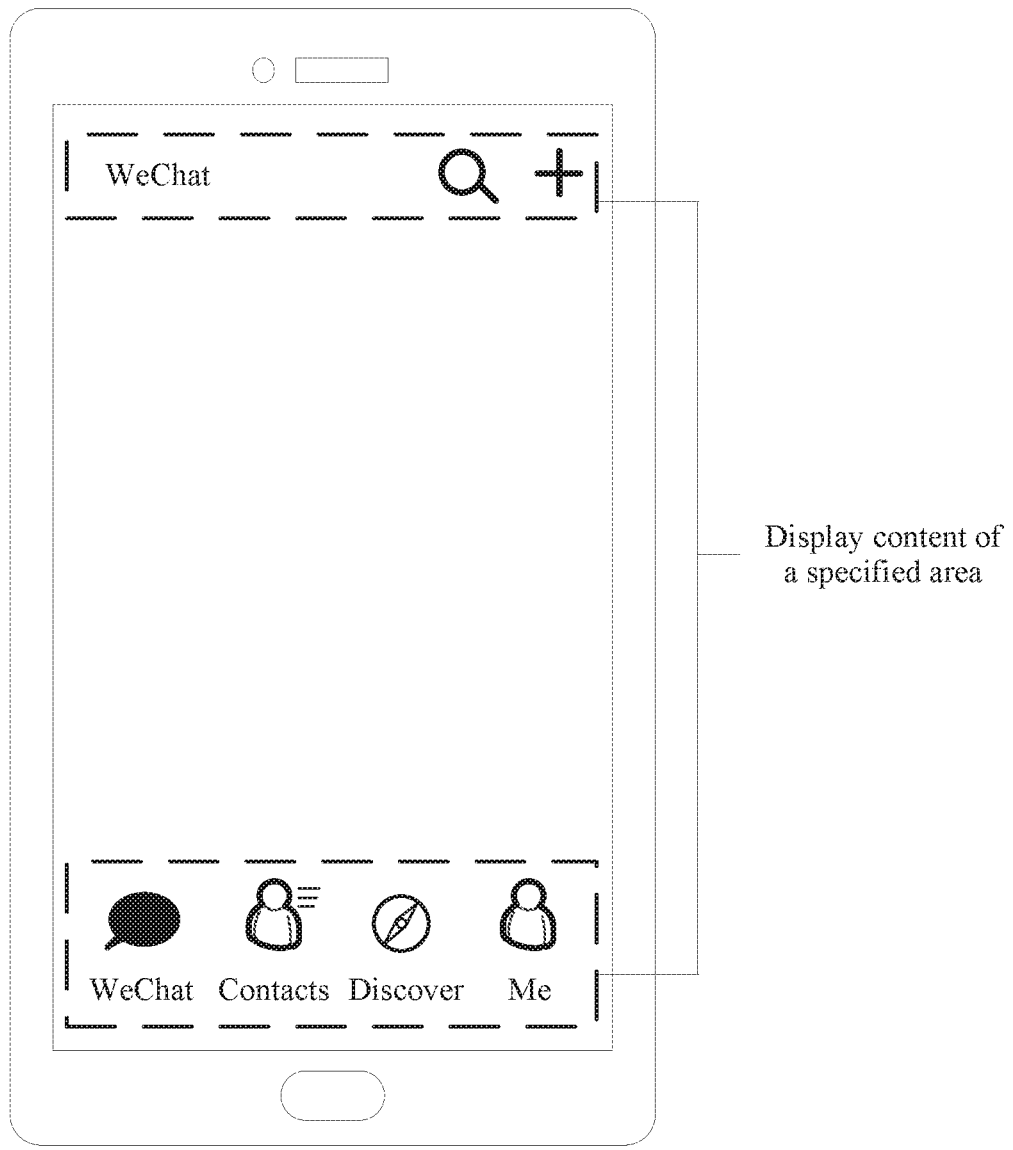
FIG. 12 is a schematic diagram of a display interface of WeChat according to an embodiment of the present invention.

For example, as shown in FIG. 12, a display interface of WeChat is used as an example. Parts circled by dashed-line boxes may be considered as display content of a specified area in the display interface. If a current interface is the same as the parts circled by the dashed-line boxes in the interface in which the specified input event is generated, the current interface is considered as the interface in which the specified input event is generated. It should be noted that, in this embodiment of the present invention, content of a fixed user interface in a display interface is usually used as a basis for comparison. In this case, even if there is a difference between types, models, or the like of the playing terminal and the screen recording terminal, the foregoing process of determining whether the interfaces are the same can be completed. In FIG. 12, the parts circled by the dashed-line boxes are content of a fixed user interface in the display interface of WeChat, that is, content that is presented when the display interface is displayed on any terminal.

It can be learned that, when event content of each input event is being performed, a matching operation needs to be performed, so as to avoid a problem, caused by a performance difference between terminals, that a time interval between performing of two adjacent input events on a specified terminal is different from a time interval between performing of the two adjacent input events on a current terminal, and after interface matching succeeds, corresponding event content is performed, thereby increasing a success rate of implementing intelligent playback, and effectively avoiding a problem such as an intelligent playback failure or intelligent playback termination caused by a performance difference between two terminals.

Figure 13:
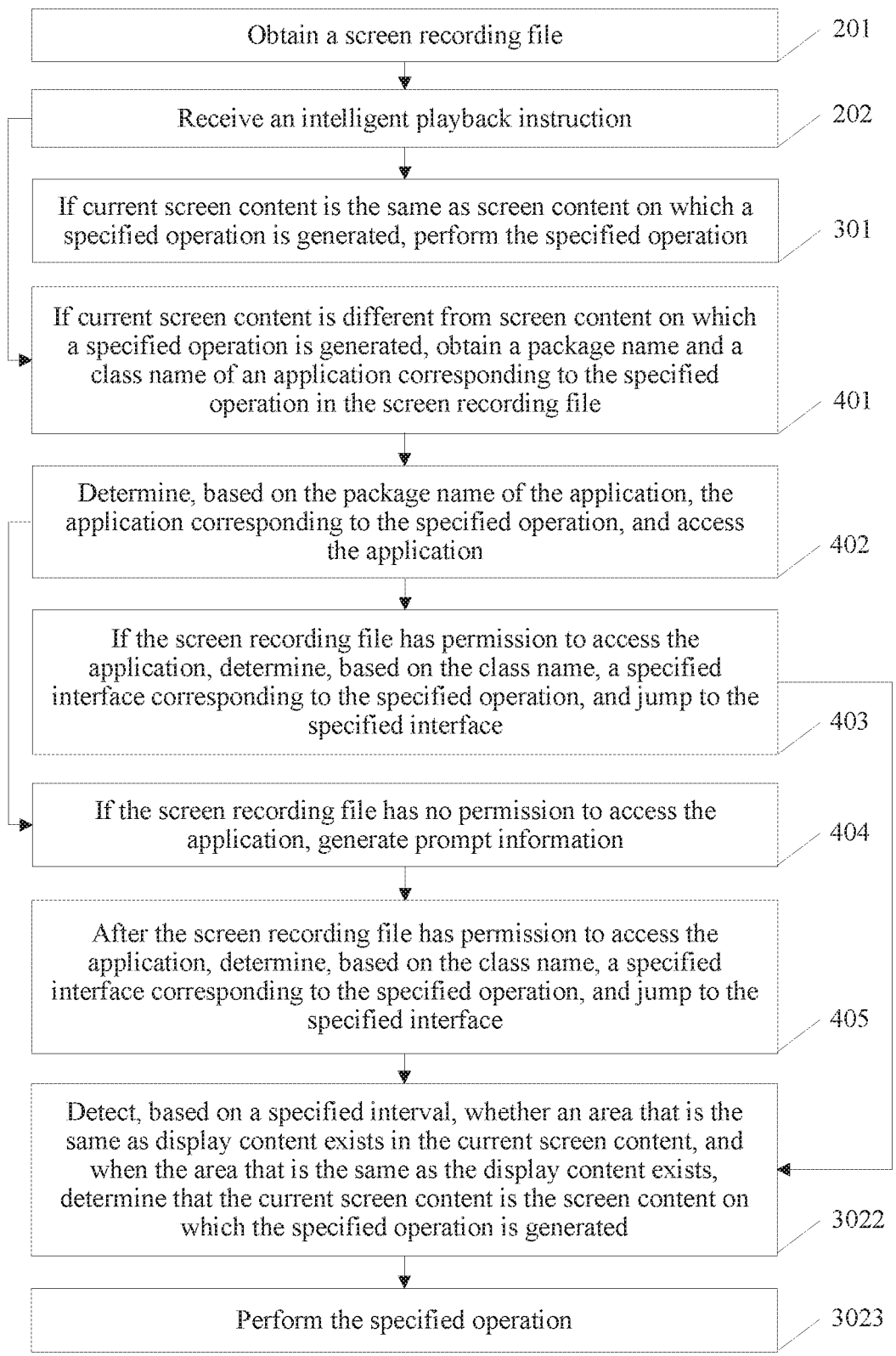
FIG. 13 and FIG. 14 are flowcharts of another screencast playing method according to an embodiment of the present invention.

Because the current display interface of the playing terminal may be different from the interface of the specified input event when intelligent playback is selected, to quickly determine the interface in which the specified input event is generated, in an implementation of this embodiment of the present invention, the playing terminal may find, based on a package name and a class name of an application, the application that is running or that is not started. After the application is started, the playing terminal finds a specific display interface in the application based on the class name, so as to implement a jump to the interface of the specified input event. Therefore, based on the implementation shown in FIG. 11, an implementation shown in FIG. 13 may be further implemented. Before step 3021 of obtaining the display content of the specified area in the interface in which the specified operation is generated is performed, the playing terminal further needs to jump to the specified interface. Therefore, step 3021 may be specifically implemented as step 401 to step 405.

Step 401: If the current screen content is different from the screen content on which the specified operation is generated, obtain a package name and a class name of an application corresponding to the specified operation in the screen recording file.

Step 402: Determine, based on the package name of the application, the application corresponding to the specified operation, and access the application.

Step 403: If the screen recording file has permission to access the application, determine, based on the class name, a specified interface corresponding to the specified operation, and jump to the specified interface.

Step 404: If the screen recording file has no permission to access the application, generate prompt information.

The prompt information is used to prompt the user to enable the permission to access the application.

Step 405: After the screen recording file has the permission to access the application, determine, based on the class name, the specified interface corresponding to the specified operation, and jump to the specified interface.

In this embodiment of the present invention, before starting the entire intelligent playback process, the playing terminal may first jump to the interface corresponding to the specified input event, to be specific, jump to the interface in which the specified operation of the specified input event is generated, that is, the foregoing specified interface, so that after starting the intelligent playback, the playing terminal can directly complete the event content of the at least one input event based on content recorded in the screen recording operation intelligent playback part.

Figure 14:
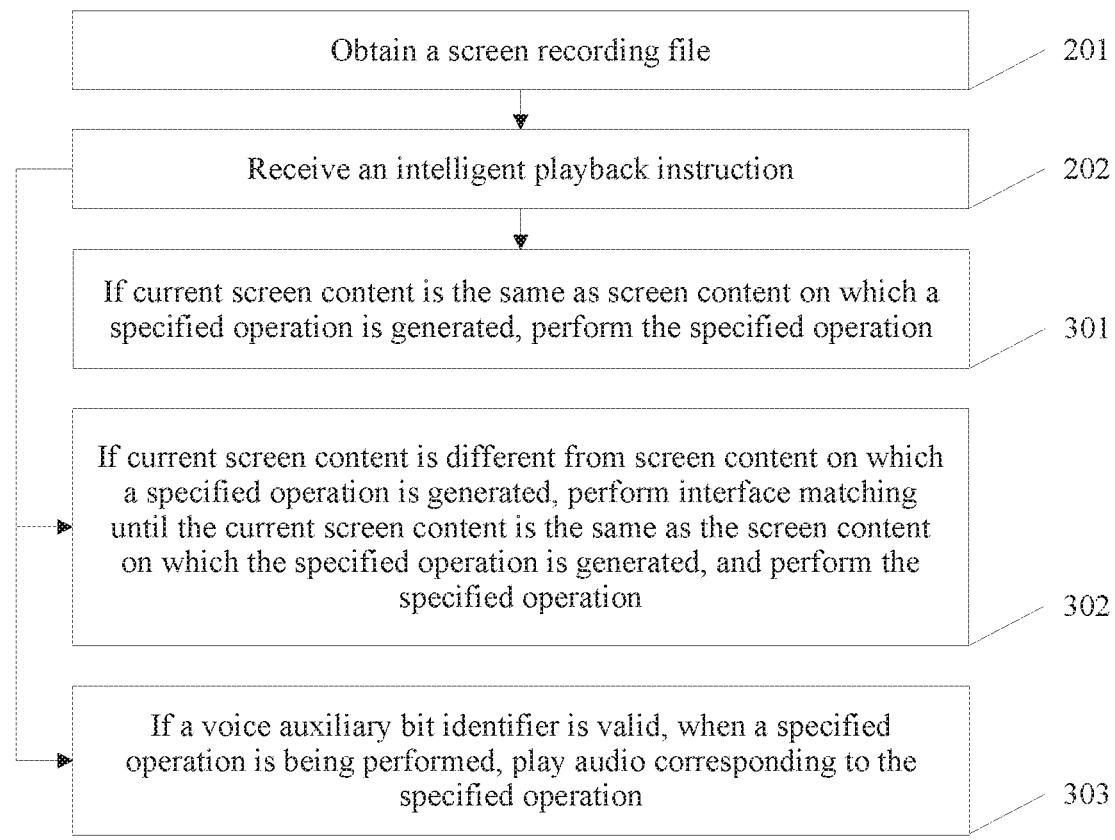

Because a user who uses intelligent playback may be a user with a visual impairment, to help the user know operation steps in the entire intelligent playback process, in an implementation of this embodiment of the present invention, the screen recording operation intelligent playback part further includes a voice auxiliary bit identifier. In a process in which the playing terminal performs intelligent playback, the playing terminal may choose, based on information recorded in the voice auxiliary bit, whether to play audio corresponding to the specified operation that is being performed, and play the audio when the audio needs to be played. Therefore, based on the implementations shown in FIG. 10, FIG. 11, and FIG. 13, for example, based on the implementation shown in FIG. 10, an implementation shown in FIG. 14 may be further implemented. After step 202 of receiving the intelligent playback instruction is performed, step 303 may be further performed.

Step 303: If a voice auxiliary bit identifier is valid, when the specified operation is being performed, play audio corresponding to the specified operation.

For example, if the voice auxiliary bit identifier is 1, it is considered that the voice auxiliary bit identifier is valid, and when specified event content of a specified input event is performed, audio corresponding to the specified event content is played, to notify the user of a currently performed operation. If the voice auxiliary bit identifier is 0, it is considered that the voice auxiliary bit identifier is invalid, and only specified event content of a specified input event is performed, that is, a specified operation is performed, but audio corresponding to the specified operation is not played.

It should be noted that, in a process in which the screen recording terminal records a screencast, the screen recording process may be triggered in a manner such as touching and holding a power button or a volume button. After the screen recording process starts, the user may complete a series of operations on the playing terminal to implement corresponding functions.

Figure 15:
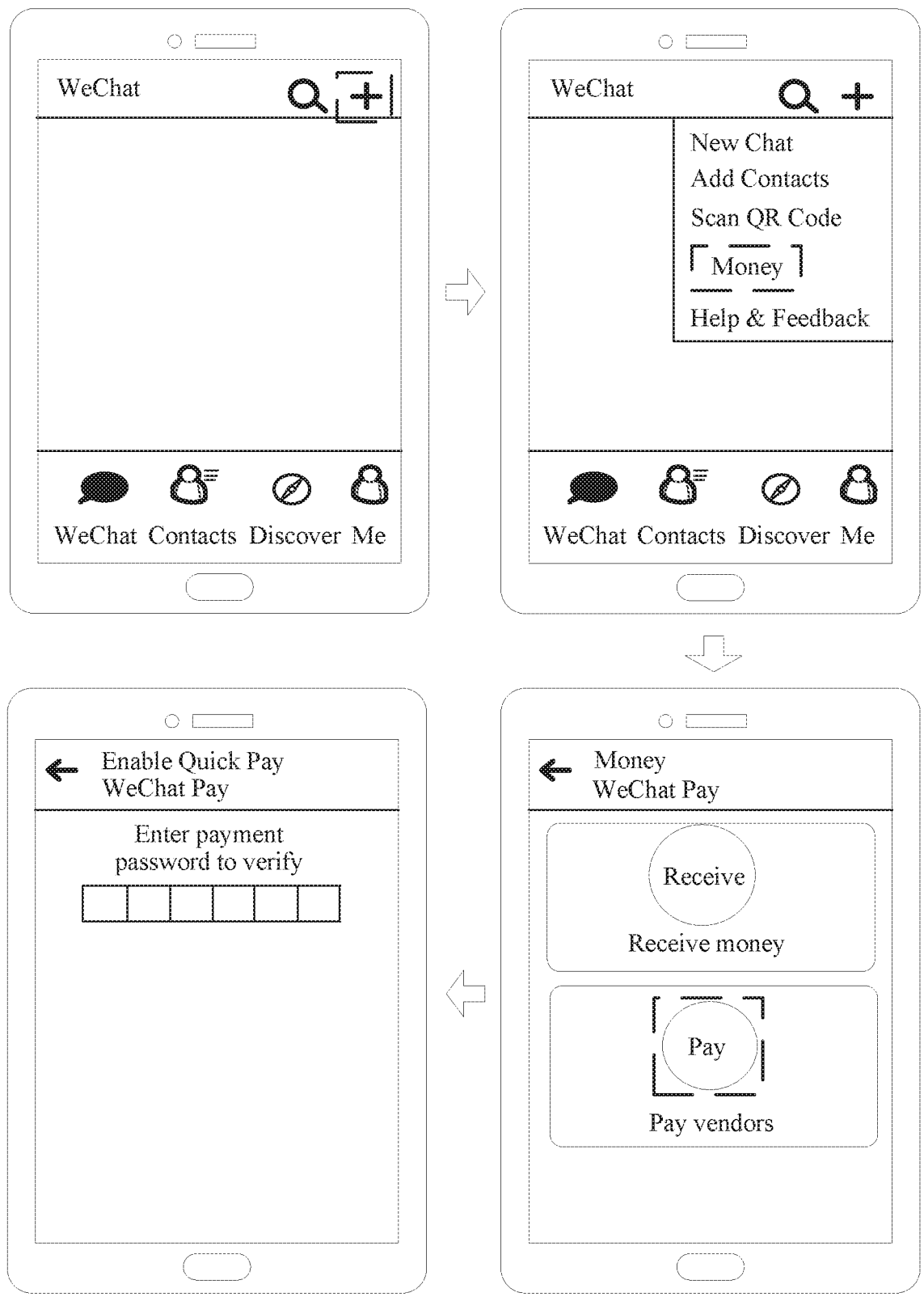
FIG. 15 is a schematic diagram of another display interface of WeChat according to an embodiment of the present invention.

A payment process in WeChat is used as an example. FIG. 15 shows a complete payment process. When a current interface is the display interface of WeChat, a user taps a "+" button on an upper right corner of the display interface, selects a "Money" option, and then touches an area used to represent a payment operation after a jump to a payment/money receiving interface is performed, and then a jump to an interface for entering a payment password is performed. After a current terminal obtains the screen recording file and completes an intelligent playback process, a current display interface is also an interface for entering a payment password.

It should be noted that after performing the at least one operation, based on a requirement of the user, the playing terminal may jump from a current interface to a display interface existing before the at least one operation is performed. In the example of FIG. 15, after the payment operation is completed, a direct jump from the payment interface to the main interface of WeChat is performed.

It may be understood that to implement the foregoing functions, the screen recording terminal and the playing terminal include corresponding hardware structures and/or software structures for performing the functions. A person skilled in the art should easily be aware that, in combination with the examples described in the embodiments disclosed in this specification, units and algorithm steps may be implemented by hardware or a combination of hardware and computer software in the embodiments of the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of the present invention, functional modules of the screen recording terminal, the playing terminal, and the like may be obtained through division based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that the module division in the embodiments of the present invention is an example, and is merely logical function division, and there may be another division manner in actual implementation.

Figure 16:
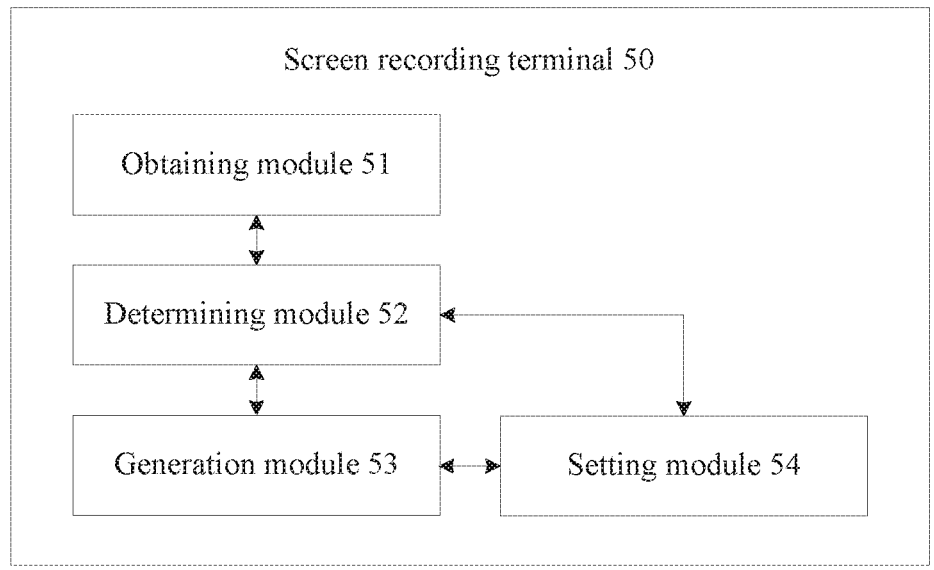
FIG. 16 is a schematic structural diagram of a screen recording terminal according to an embodiment of the present invention.

When each functional module may be obtained through division based on each corresponding function, FIG. 16 is a possible schematic structural diagram of a screen recording terminal in the foregoing embodiments. A screen recording terminal 50 includes an obtaining module 51, a determining module 52, a generation module 53, and a setting module 54. The obtaining module 51 is configured to support the screen recording terminal 50 in performing the obtaining operation in step 101 in FIG. 2. The determining module 52 is configured to support the screen recording terminal 50 in performing the determining operation in step 101 in FIG. 2. The generation module 53 is configured to support the screen recording terminal 50 in performing step 102 and step 103 in FIG. 2. The setting module 54 is configured to support a process in which the screen recording terminal 50 gradually generates a screen recording operation intelligent playback part and a screen recording file. All related content of each step in the foregoing method embodiments may be cited in function description of a corresponding functional module, and details are not described herein.

Figure 17:
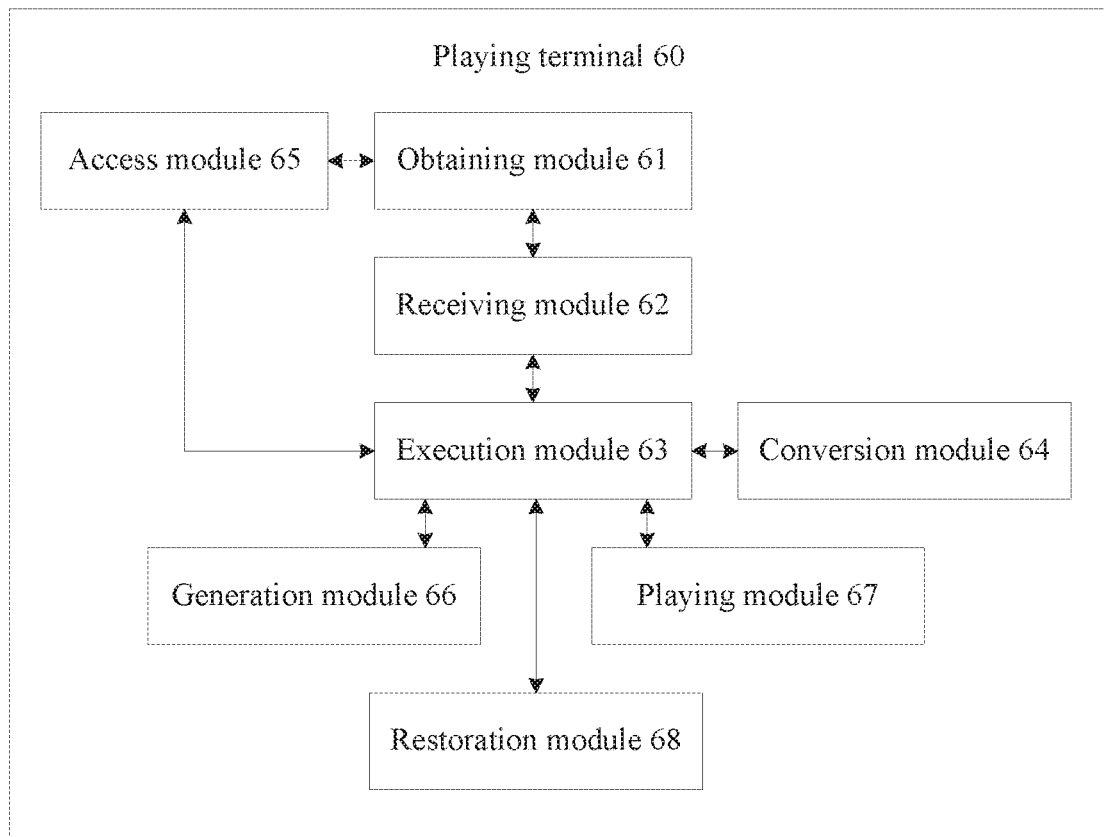
FIG. 17 is a schematic structural diagram of a playing terminal according to an embodiment of the present invention.

FIG. 17 is a possible schematic structural diagram of a playing terminal in the foregoing embodiments. A playing terminal 60 includes an obtaining module 61, a receiving module 62, an execution module 63, a conversion module 64, an access module 65, a generation module 66, a playing module 67, and a restoration module 68. The obtaining module 61 is configured to support the playing terminal 60 in performing step 201 in FIG. 5, FIG. 7, FIG. 9, FIG. 10, FIG. 11, FIG. 13, and FIG. 14, step 3021 in FIG. 11, and step 401 in FIG. 13. The receiving module 62 is configured to support the playing terminal 60 in performing step 202 in FIG. 5, FIG. 7, FIG. 9, FIG. 10, FIG. 11, FIG. 13, and FIG. 14. The execution module 63 is configured to support the playing terminal 60 in performing step 203 in FIG. 5, step 2031 and step 205 in FIG. 7, step 2032 in FIG. 9, step 301 and step 302 in FIG. 10, step 301 and step 3021 to step 3023 in FIG. 11, step 301, step 403, step 405, step 3022, and step 3033 in FIG. 13, and step 301 and step 302 in FIG. 14. The conversion module 64 is configured to support the playing terminal 60 in performing step 204 in FIG. 7. The access module 65 is configured to support the playing terminal 60 in performing step 402 in FIG. 13. The generation module 66 is configured to support the playing terminal 60 in performing step 404 in FIG. 13. The playing module 67 is configured to support the playing terminal 60 in performing step 303 in FIG. 14. The restoration module 68 is configured to support the playing terminal 60 in jumping, after at least one operation is performed, to an interface existing before the at least one operation is performed. All related content of each step in the foregoing method embodiments may be cited in function description of a corresponding functional module, and details are not described herein.

Figure 18:
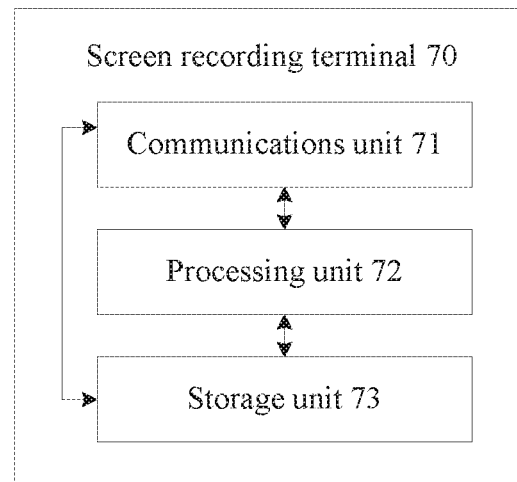
FIG. 18 and FIG. 20 are schematic structural diagrams of another screen recording terminal according to an embodiment of the present invention.

When an integrated unit is used, FIG. 18 is a possible schematic structural diagram of a screen recording terminal 70 in the foregoing embodiments. The screen recording terminal 70 includes a communications unit 71 and a processing unit 72. The communications unit 71 is configured to support the screen recording terminal 70 in performing the obtaining operation in step 101 in FIG. 2, and is further configured to support communication between the screen recording terminal 70 and another device such as a playing terminal, or is configured to collect a corresponding instruction or the like triggered by a user. The processing unit 72 is configured to support the screen recording terminal 70 in performing the determining operation in step 101, step 102, and step 103 in FIG. 2, and support a process of gradually generating a screen recording operation intelligent playback part and a screen recording file, and/or is configured to perform another process of the technology described in this specification. In addition, the screen recording terminal 70 may further include a storage unit 73, configured to store program code and data of a base station.

Figure 19:
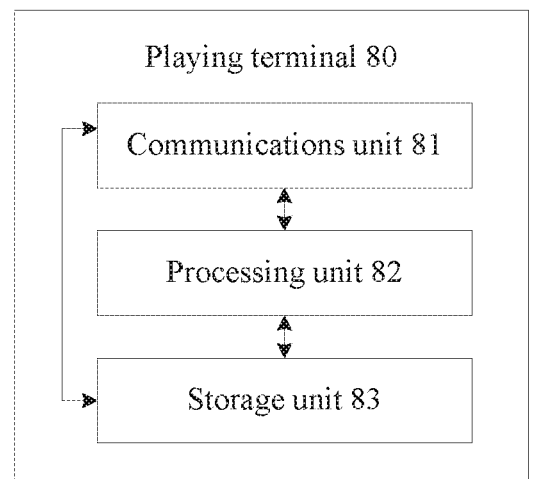
FIG. 19 and FIG. 21 are schematic structural diagrams of another playing terminal according to an embodiment of the present invention.

FIG. 19 is a possible schematic structural diagram of a playing terminal 80 in the foregoing embodiments. The playing terminal 80 includes a communications unit 81 and a processing unit 82. The communications unit 81 is configured to support the playing terminal 80 in performing step 201 and step 202 in FIG. 5, FIG. 6, FIG. 9, FIG. 10, FIG. 11, FIG. 13, and FIG. 14, step 3021 in FIG. 11, and step 401 in FIG. 13, and is further configured to support communication between the playing terminal 80 and another device such as a screen recording terminal, or is configured to collect a corresponding instruction or the like triggered by a user. The processing unit 82 is configured to support the playing terminal 80 in performing step 203 in FIG. 5, step 2031, step 203, and step 205 in FIG. 7, step 2032 in FIG. 9, step 301 in FIG. 10, FIG. 11, and FIG. 13, step 302 in FIG. 10 and FIG. 14, step 3022 and step 3023 in FIG. 11 and FIG. 13, step 402 to step 405 in FIG. 13, and step 303 in FIG. 14, and support a process of gradually generating a screen recording operation intelligent playback part and a screen recording file, and/or is configured to perform another process of the technology described in this specification. In addition, the playing terminal 80 may further include a storage unit 83, configured to store program code and data of a base station.

The processing units in the screen recording terminal and the playing terminal each may be a processor or a controller, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic component, a transistor logic component, a hardware component, or any combination thereof. The processing units may implement or execute various example logical blocks, units, and circuits described with reference to content disclosed in the embodiments of the present invention. The processor may be a combination of processors implementing a computing function, for example, a combination of one or more microprocessors, or a combination of a DSP and a microprocessor. The communications unit in the screen recording terminal and the playing terminal each may be implemented as a transceiver, a transceiver circuit, a communications interface, or the like. The storage units in the screen recording terminal and the playing terminal each may be implemented as a memory.

Figure 20:
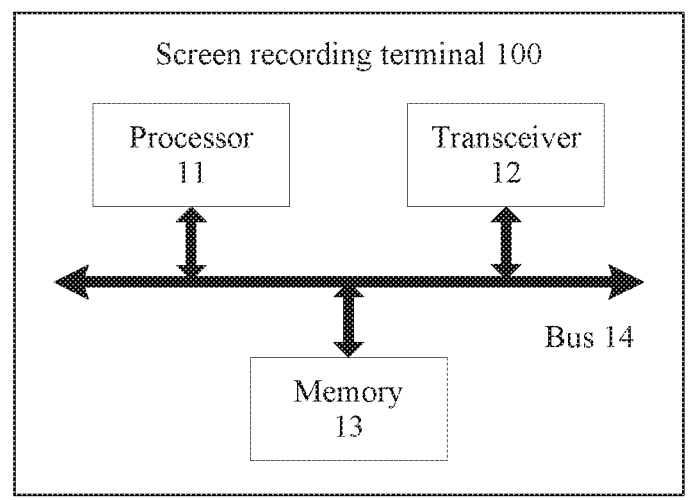

For the screen recording terminal, if a function of the communications unit 71 is implemented by a transceiver, a function of the processing unit 72 is implemented by a processor, and a function of the storage unit 73 is implemented by a memory, a screen recording terminal 100 in an embodiment of the present invention may be shown in FIG. 20. As shown in FIG. 20, the screen recording terminal 100 includes a processor 11, a transceiver 12, a memory 13, and a bus 14. The processor 11, the transceiver 12, and the memory 13 are connected to each other by using the bus 14.

Figure 21:
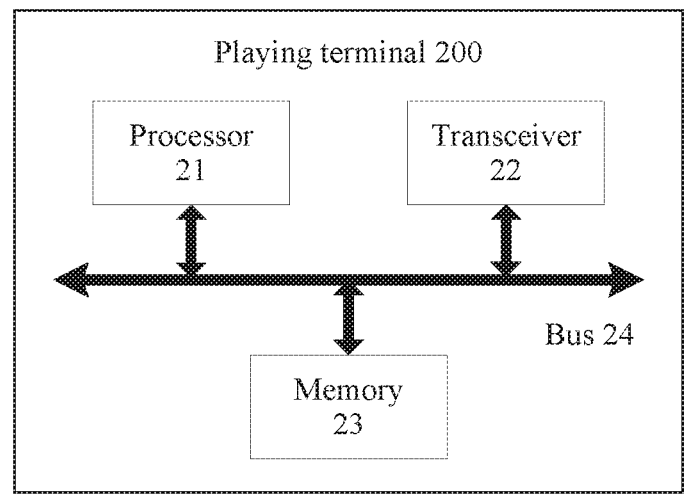

For the playing terminal, if a function of the communications unit 81 is implemented by a transceiver, a function of the processing unit 82 is implemented by a processor, and a function of the storage unit 83 is implemented by a memory, a playing terminal 200 in an embodiment of the present invention may be shown in FIG. 21. As shown in FIG. 21, the playing terminal 200 includes a processor 21, a transceiver 22, a memory 23, and a bus 24. The processor 21, the transceiver 22, and the memory 23 are connected to each other by using the bus 24.

The bus 14 and the bus 24 each may be a Peripheral Component Interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of indication, the bus is indicated by using only one bold line in FIG. 20 and FIG. 21. However, it does not indicate that there is only one bus or only one type of bus.

The methods or algorithm steps described with reference to the content disclosed in the embodiments of the present invention may be implemented in a hardware manner, or may be implemented in a manner of executing a software instruction by a processor. The software instruction may include a corresponding software module. The software module may be stored in a random access memory (Random Access Memory, RAM), a flash memory, a read-only memory (Read-Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or a storage medium in any other forms well-known in the art. An example storage medium is coupled to the processor, so that the processor can read information from the storage medium, and can write information into the storage medium. Certainly, the storage medium may be a part of the processor. Alternatively, the processor and the storage medium may exist in a core network interface device as discrete components.

A person skilled in the art should be aware that in one or more of the foregoing examples, the functions described in the embodiments of the present invention may be implemented by using hardware, software, firmware, or any combination thereof. When the embodiments are implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the embodiments of the present invention are further described in detail in the foregoing specific embodiments. It should be understood that the foregoing descriptions are merely specific implementations of the present invention, but are not intended to limit the protection scope of the present invention. Any modification, equivalent replacement, or improvement made based on the technical solutions in the embodiments of the present invention shall fall within the protection scope of the embodiments of the present invention.

What is claimed is:

1. A screencast recording method applied to a screen recording terminal, wherein the screencast recording method comprises:
   obtaining at least one operation from a screen recording user on the screen recording terminal;
   determining screen content and event content that correspond to the at least one operation, wherein the event content comprises at least content that indicates a manner of performing the at least one operation;
   generating video data and a screen recording operation intelligent playback part based on the screen content and the event content that correspond to the at least one operation, wherein the screen recording operation intelligent playback part comprises at least corresponding screen content and event content corresponding to each of the at least one operation, and a voice auxiliary bit identifier;
   setting the voice auxiliary bit identifier to be valid when audio exists for an operation of the at least one operation that corresponds to the voice auxiliary bit identifier; and
   generating a screen recording file that comprises the video data and the screen recording operation intelligent playback part.

2. The screencast recording method of claim 1, further comprising playing the screen recording file.

3. The screencast recording method of claim 1, further comprising:
   receiving an intelligent playback instruction;
   triggering playing of the screen recording operation intelligent playback part and performing the at least one operation on the screen recording terminal based on receiving the intelligent playback instruction; and
   performing the at least one operation according to the intelligent playback instruction.

4. The screencast recording method of claim 1, further comprising sending the screen recording file to a screen playing terminal.

5. A screencast playing method applied to a playing terminal, wherein the screencast playing method comprises:
   obtaining a screen recording file that comprises at least video data and a screen recording operation intelligent playback part that comprises at least corresponding screen content and event content that indicate at least one operation in the video data, wherein the event content comprises at least content used to indicate a manner of generating the at least one operation;
   receiving an intelligent playback instruction from a screen recording terminal;
   when a resolution of the playing terminal is different from a resolution of the screen recording terminal, converting coordinates of a screen touching operation generated on the screen recording terminal in the video data into specified coordinates on the playing terminal, wherein the screen recording terminal is a terminal that generates the screen recording file;
   performing the at least one operation on the playing terminal based on the specified coordinates;
   triggering playing of the screen recording operation intelligent playback part and performing of the at least one operation on the playing terminal based on receiving the intelligent playback instruction; and
   performing the at least one operation according to the intelligent playback instruction.

6. The screencast playing method of claim 5, wherein obtaining the screen recording file comprises receiving the screen recording file from a screen recording terminal.

7. The screencast playing method of claim 5, wherein the performing the at least one operation comprises when the resolution of the playing terminal is the same as the resolution of the screen recording terminal, successively performing each of the at least one operation.

8. The screencast playing method of claim 5, wherein the performing the at least one operation comprises:
   when a current screen content is the same as screen content corresponding to a first operation of the at least one operation, performing the first operation; or
   when the current screen content is different from the screen content of each of the at least one operation:
       performing interface matching until the current screen content is the same as the screen content corresponding to the first operation; and
       performing the first operation.

9. The screencast playing method of claim 8, wherein the performing interface matching until the current screen content is the same as the screen content corresponding to the first operation comprises:
   obtaining display content of a display area in an interface corresponding to the first operation;
   detecting, based on a predetermined interval, whether the current screen content includes an area that is the same as the display area; and
   when the display content includes the area that is the same as the display area, determining that the current screen content is the screen content on which the first operation is performed.

10. The screencast playing method of claim 9, wherein the screencast playing method further includes before the obtaining the display area:
    obtaining a package name and a class name of an application corresponding to the first operation in the screen recording file;
    determining, based on the package name of the application, the application corresponding to the first operation;
    accessing the application; and
    when the screen recording file has permission to access the application:
        determining, based on the class name, a first interface corresponding to the first operation, and
        jumping to the first interface.

11. The screencast playing method of claim 10, further comprising after the determining, based on the package name of the application, the application corresponding to the first operation and accessing the application:
    when the screen recording file does not have permission to access the application, generating prompt information that prompts a user to enable the permission to access the application; and
    after the screen recording file has obtained the permission to access the application:
        determining, based on the class name, the first interface corresponding to the first operation; and
        jumping to the first interface.

12. The screencast playing method of claim 11, wherein the screen recording operation intelligent playback part further comprises a voice auxiliary bit identifier, and wherein the method further comprises playing audio corresponding to the first operation when the first operation is being performed and the voice auxiliary bit identifier is valid.

13. The screencast playing method of claim 5, further comprising jumping, after the performing the at least one operation, from a current interface to a display interface existing before the at least one operation is performed.

14. A screen recording terminal, comprising:
a screen; and
one or more processors coupled to the screen and configured to:
    obtain at least one operation performed by a screen recording user on the screen recording terminal;
    determine screen content and event content that correspond to the at least one operation, wherein the event content comprises at least content that indicates a manner of performing the at least one operation;
    generate video data and a screen recording operation intelligent playback part based on the screen content and the event content, wherein the screen recording operation intelligent playback part comprises at least corresponding screen content and event content that indicate each of the at least one operation in the video data, and a voice auxiliary bit identifier;
    set the voice auxiliary bit identifier to be valid when audio exists for an operation of the at least one operation that corresponds to the voice auxiliary bit identifier; and
    generate a screen recording file that comprises the video data and the screen recording operation intelligent playback part.

15. The screen recording terminal of claim 14, wherein the one or more processors are further configured to play the screen recording file.

16. The screen recording terminal of claim 14, wherein the one or more processors are further configured to:
    receive an intelligent playback instruction;
    trigger playing of the screen recording operation intelligent playback part and performing of the at least one operation on the screen recording terminal based on receiving the intelligent playback instruction; and
    perform the at least one operation according to the intelligent playback instruction.

17. The screen recording terminal of claim 14, wherein the one or more processors are further configured to cause the screen recording terminal to send the screen recording file to a screen playing terminal.

* * * * *